(12) United States Patent
Noh et al.

(10) Patent No.: US 11,115,163 B2
(45) Date of Patent: Sep. 7, 2021

(54) ENHANCED RESOURCE UNIT ALLOCATION IN WIRELESS LOCAL AREA NETWORK

(71) Applicant: NEWRACOM, Inc., Lake Forest, CA (US)

(72) Inventors: Sichan Noh, Seoul (KR); Yujin Noh, Irvine, CA (US); Jong-ee Oh, Irvine, CA (US); Min Seoung Kim, Irvine, CA (US); Dae Kyun Lee, Irvine, CA (US); Youngjae Jung, Seoul (KR); Hyobin Yim, Seoul (KR); Jaeyoung Ryu, Lake Forest, CA (US)

(73) Assignee: NEWRACOM INC., Lake Forest, CA (US)

( * ) Notice: Subject to any disclaimer, the term of this patent is extended or adjusted under 35 U.S.C. 154(b) by 0 days.

(21) Appl. No.: 16/988,613

(22) Filed: Aug. 8, 2020

(65) Prior Publication Data
US 2021/0044398 A1 Feb. 11, 2021

Related U.S. Application Data

(60) Provisional application No. 62/885,101, filed on Aug. 9, 2019, provisional application No. 62/982,658, filed
(Continued)

(51) Int. Cl.
*H04L 5/00* (2006.01)
*H04L 1/00* (2006.01)
*H04W 84/12* (2009.01)

(52) U.S. Cl.
CPC .......... *H04L 5/0044* (2013.01); *H04L 1/0057* (2013.01); *H04L 5/0023* (2013.01); *H04W 84/12* (2013.01)

(58) Field of Classification Search
CPC ... H04L 5/0044; H04L 5/0023; H04L 1/0057; H04W 84/12
(Continued)

(56) References Cited

U.S. PATENT DOCUMENTS

2013/0179755 A1* 7/2013 Yang ...................... H04L 1/0033
714/776
2015/0365195 A1* 12/2015 Yang ................... H03M 13/271
375/295
(Continued)

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
(Continued)

*Primary Examiner* — Juan A Torres
(74) *Attorney, Agent, or Firm* — Nicholson, De Vos, Webster & Elliott, LLP

(57) ABSTRACT

A method for encoding a bitstream is described. The method includes receiving, by an error correction unit, the bitstream; performing, by the error correction unit, encoding on the bitstream to generate an encoded bit stream that includes the bitstream and parity bits; processing, by a constellation unit, the encoded bitstream to generate constellation points in one or more encoded streams; determining, by a low-density parity-check (LDPC) tone mapper, a distance between subcarriers in an Orthogonal Frequency Division Multiplexing (OFDM) symbol of the frame; and performing, by the LDPC tone mapper, LDPC tone mapping based on the one or more encoded streams and on the determined distance to generate a permuted stream of complex numbers, wherein the distance between subcarriers is determined to be either (1) 18
(Continued)

for a first resource unit size used in the frame and (2) 20 for a second resource unit size used in the frame.

20 Claims, 35 Drawing Sheets

Related U.S. Application Data on Feb. 27, 2020, provisional application No. 63/003,691, filed on Apr. 1, 2020.

(58) Field of Classification Search
USPC .......................................................... 375/260
See application file for complete search history.

(56) References Cited

U.S. PATENT DOCUMENTS

| | | | |
|---|---|---|---|
| 2016/0029397 A1* | 1/2016 | Chen ................. | H04W 72/0486 370/329 |
| 2016/0044675 A1* | 2/2016 | Chen ................. | H04L 27/2602 370/329 |
| 2016/0080043 A1* | 3/2016 | Tian ......................... | H04L 1/06 375/267 |
| 2016/0323060 A1* | 11/2016 | Hassanin .............. | H04L 1/0041 |
| 2017/0288829 A1* | 10/2017 | Srinivasa ............. | H04L 1/0057 |
| 2020/0322091 A1* | 10/2020 | Noh ...................... | H04L 1/0071 |

OTHER PUBLICATIONS

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.

* cited by examiner

| | MAXIMUM PHY RATE | PHY RATE ENHANCEMENT | BANDWIDTH/NUMBER OF SPATIAL STREAMS | OPERATING BANDS |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG} * 4$ μs | 3.2 μs | 0.8 μs | 312.5 kHz |
| EHT-SIG FIELD 722 | EHT SIGNAL FIELD | $N_{EHESIG} * 4$ μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF} *$ (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA} *$ (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

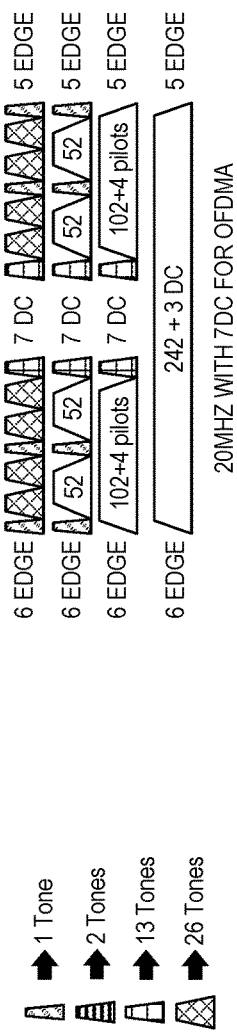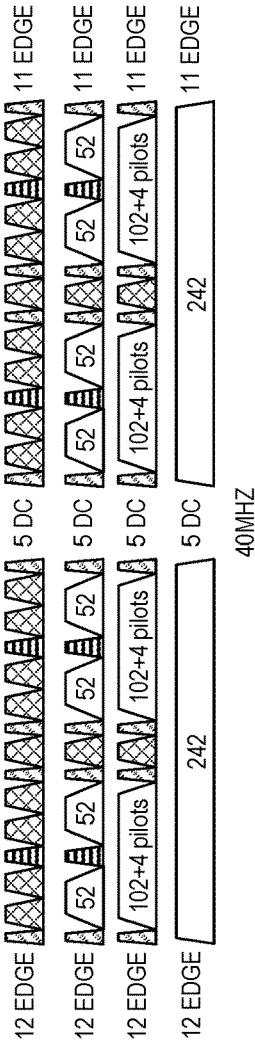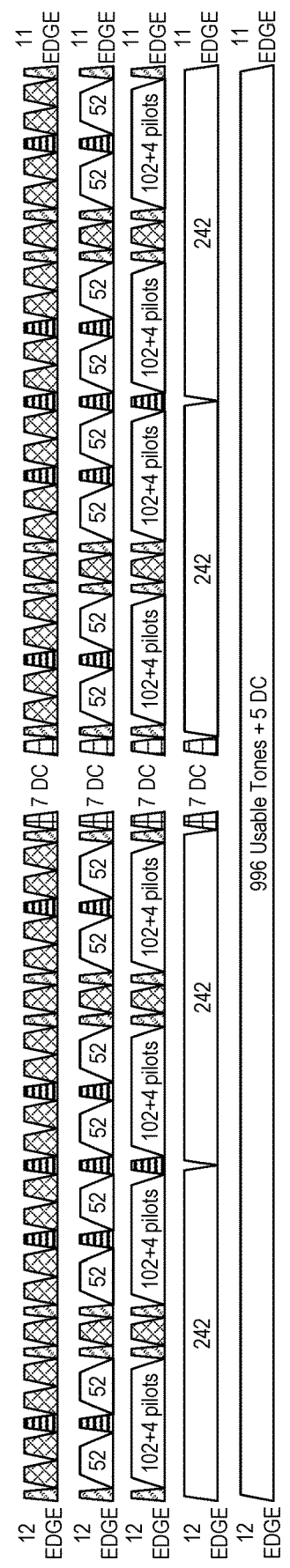
FIG. 8

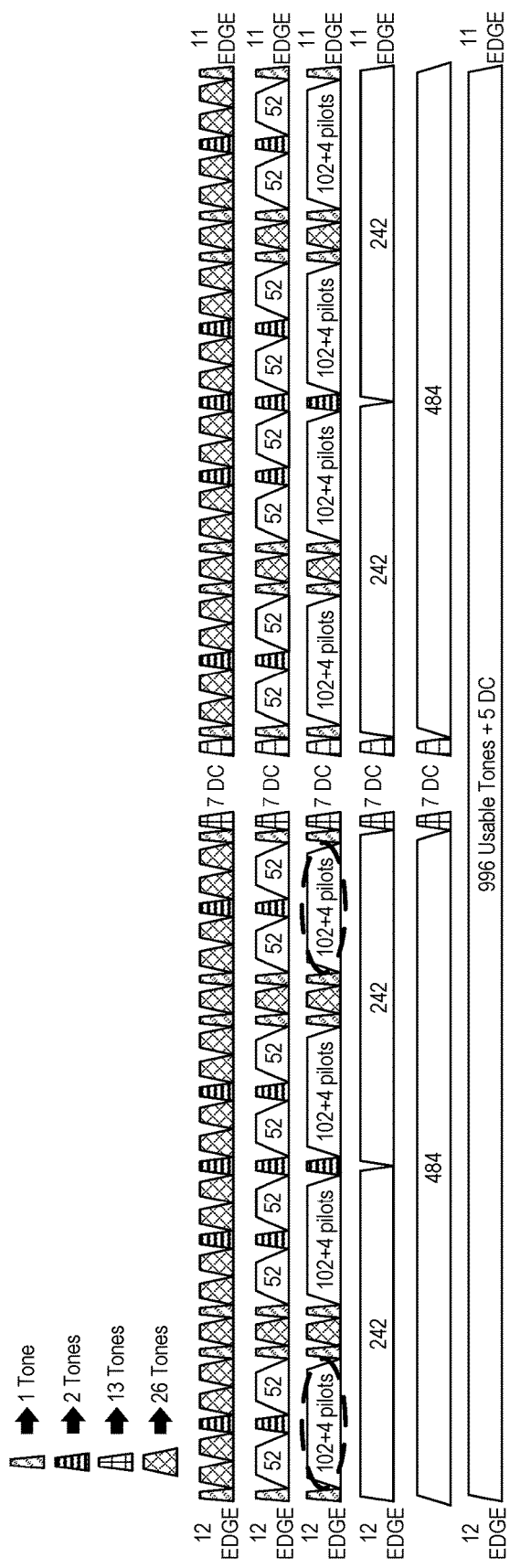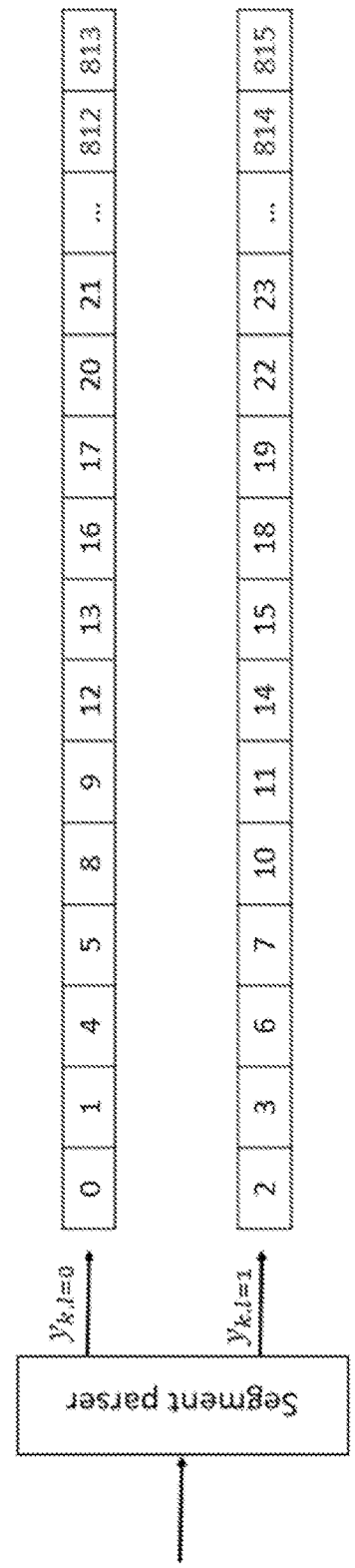
FIG. 12

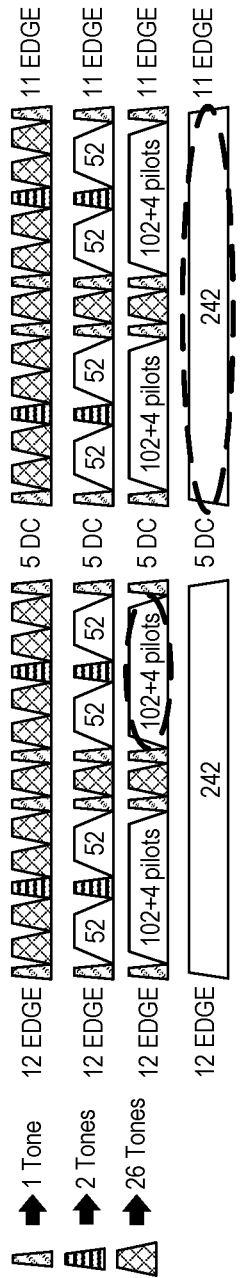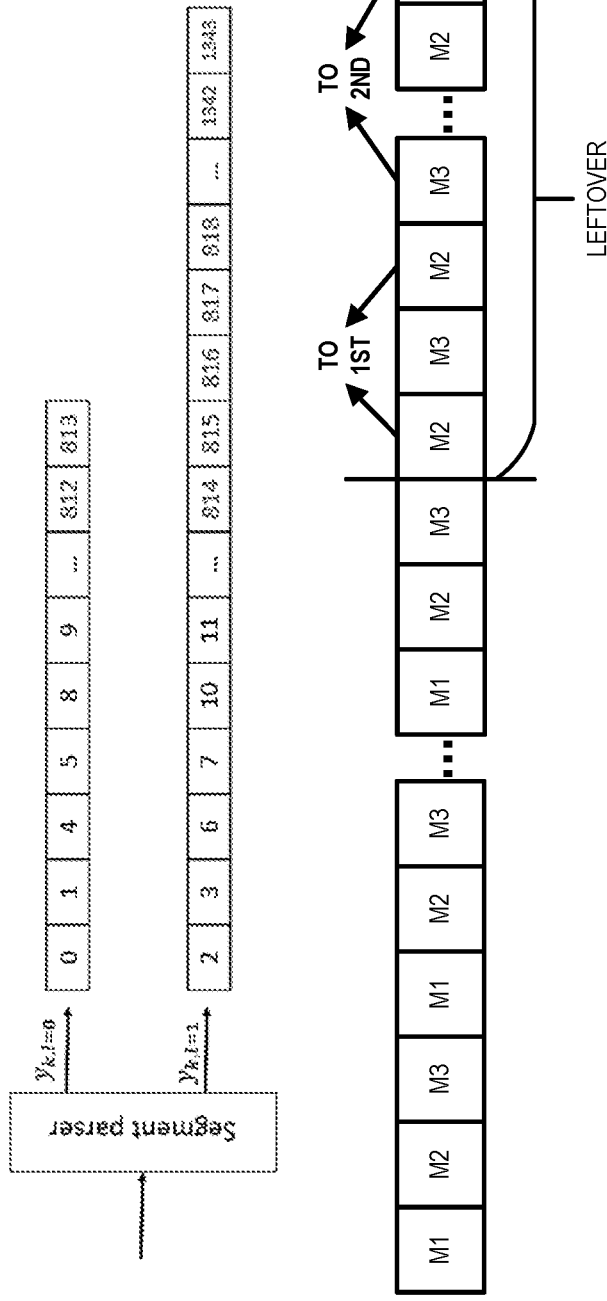
FIG. 15

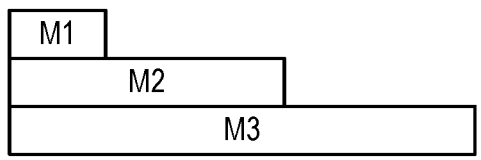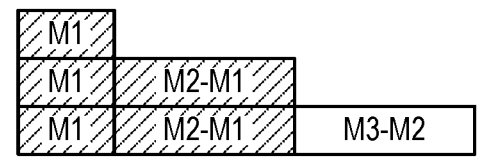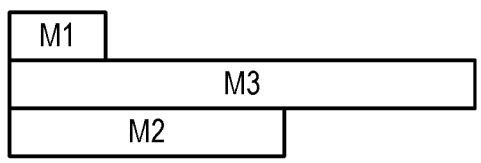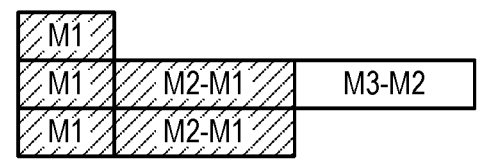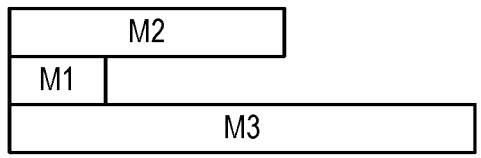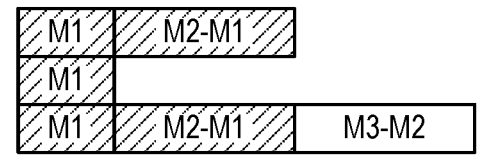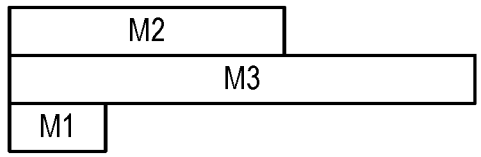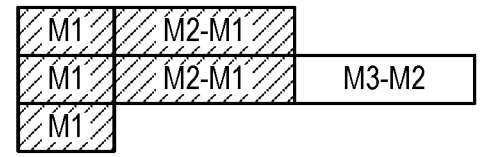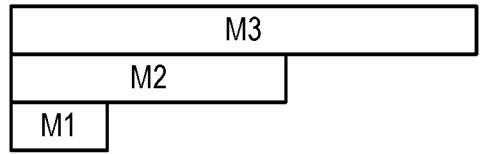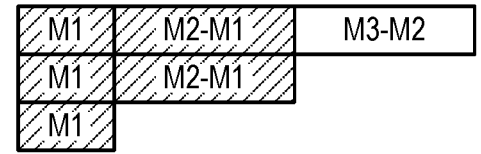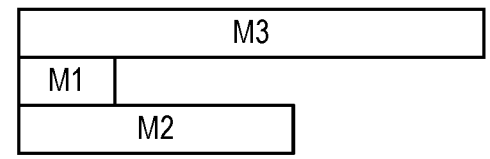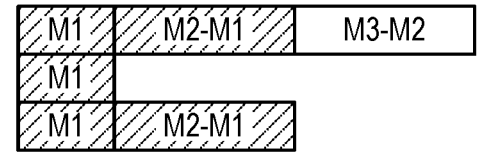
FIG. 16

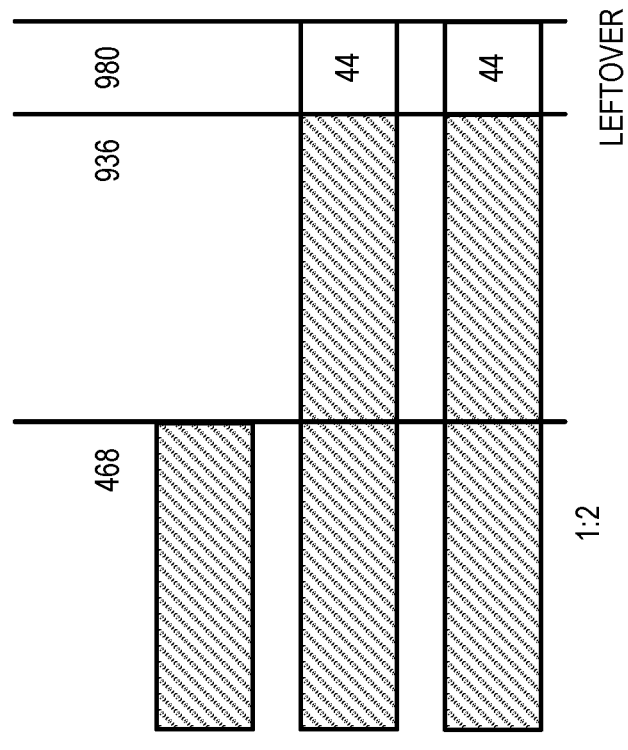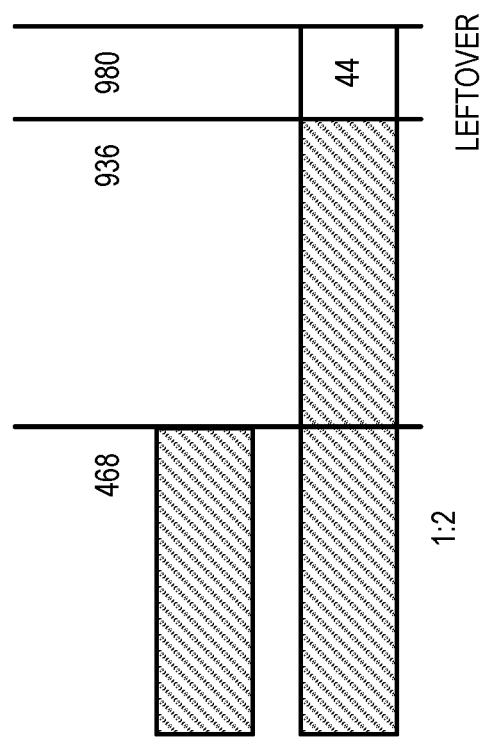
FIG. 27

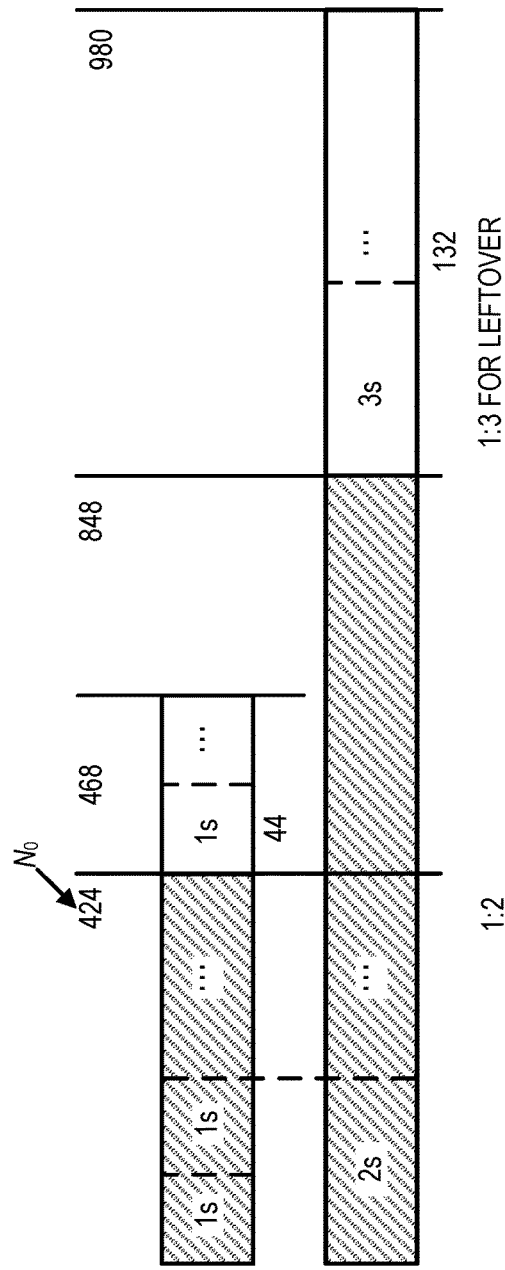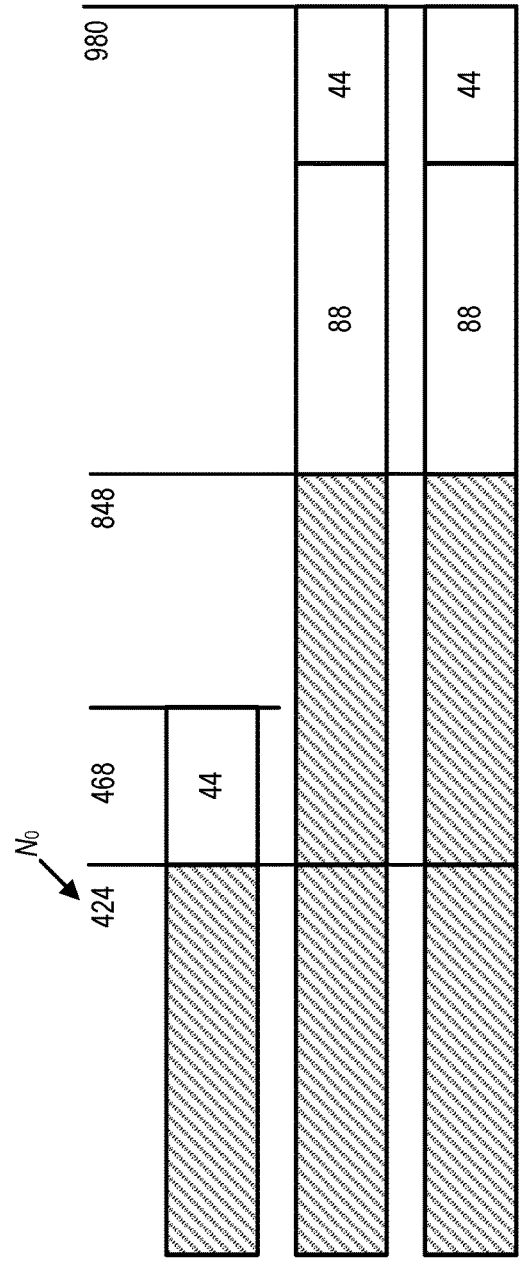
FIG. 32

ENHANCED RESOURCE UNIT ALLOCATION IN WIRELESS LOCAL AREA NETWORK

CROSS-REFERENCE TO RELATED APPLICATION

This application claims the benefit of U.S. Provisional Patent Application No. 62/885,101, filed Aug. 9, 2019; U.S. Provisional Patent Application No. 62/982,658, filed Feb. 27, 2020; and U.S. Provisional Patent Application No. 63/003,691, filed Apr. 1, 2020, which are incorporated by reference herein in their entirety.

TECHNICAL FIELD

The present disclosure generally relates to wireless communications, and more specifically, relates to a resource unit allocation in a wireless local area network.

BACKGROUND ART

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIG. 8 shows an Orthogonal Frequency Division Multiple Access (OFDMA) numerology, in accordance with some embodiments of the present disclosure.

FIG. 12 shows an example of how two 106-tone RUs are assigned to a station (STA) with segment parsing, in accordance with some embodiments of the present disclosure.

FIG. 15 shows an example of different 106-tone RU and 242-tone RU assigned to a STA in a segment parse, in accordance with some embodiments of the present disclosure.

FIG. 16 shows all cases of three different RU allocations assigned for a STA in 80/160/240/320 MHz, in accordance with some embodiments of the present disclosure.

FIG. 26 shows tone mapping parameters for a low-density parity-check (LDPC) tone mapper and various RU sizes, in accordance with some embodiments of the present disclosure.

FIG. 27 shows a proportional round robin method in segment parse, in accordance with some embodiments of the present disclosure.

FIG. 32 shows a distribution of tones into 484-tone RUs and 996-tone RUs using a modified round robin method, in accordance with some embodiments of the present disclosure.

DETAILED DESCRIPTION

Figure 1:
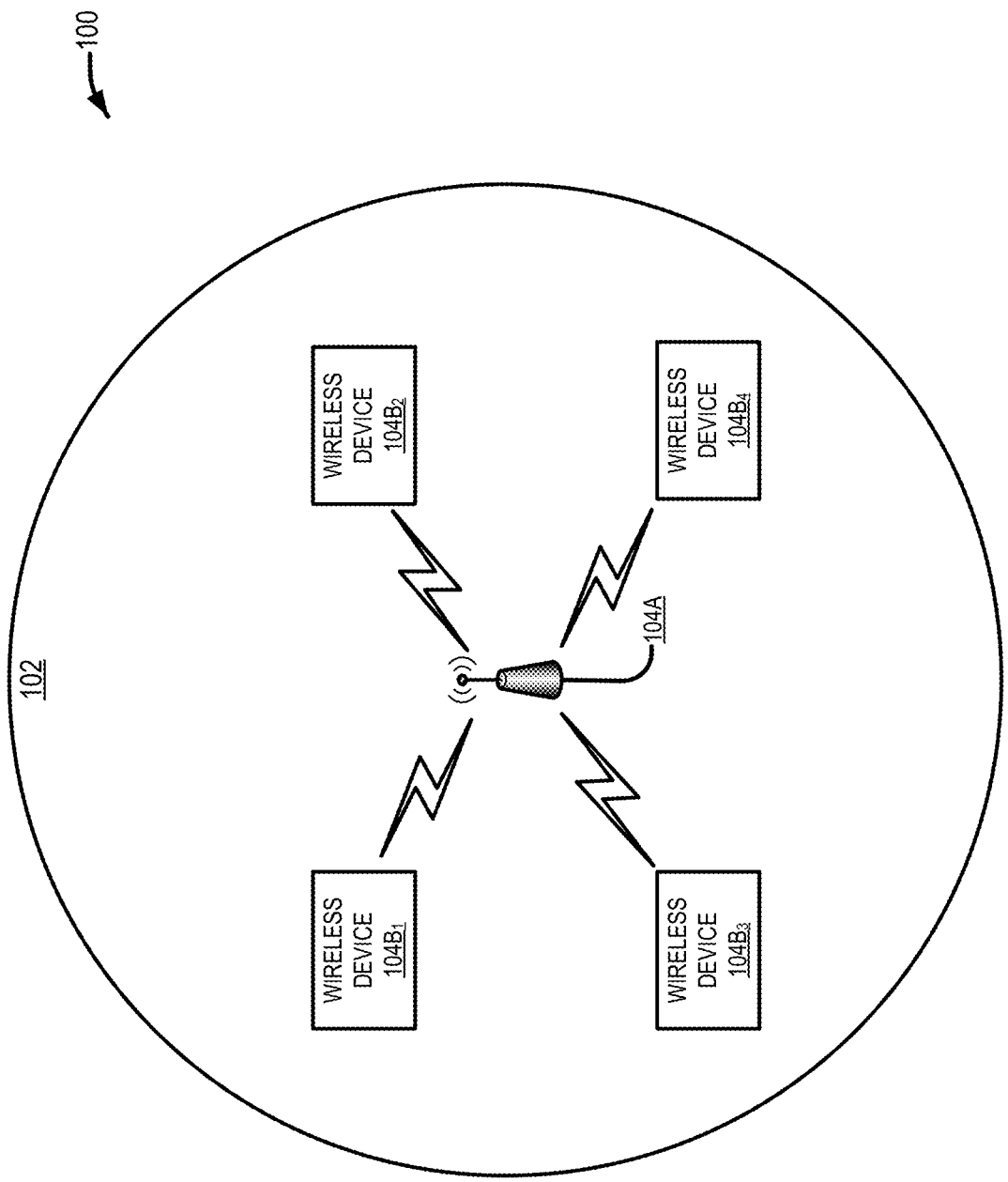
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to a resource unit allocation in a wireless local area network.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices $104B_1$-$104B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices $104B_1$-$104B_4$) may be collectively referred to as STAs. However, for ease of description, only the non-AP STAs may be referred to as STAs. Although shown with four non-AP STAs (e.g., the wireless devices $104B_1$-$104B_4$), the WLAN 100 may include any number of non-AP STAs (e.g., one or more wireless devices 104B).

Figure 2:
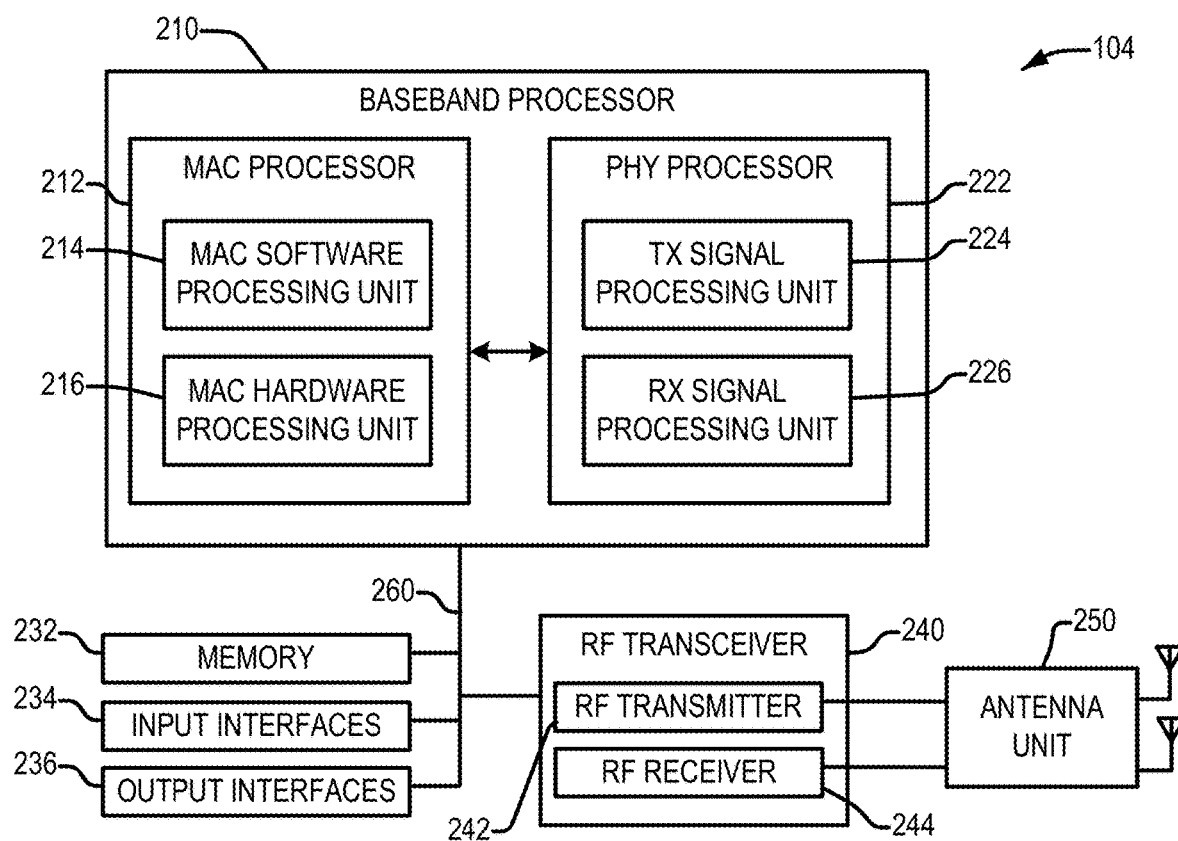
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices $104B_1$-$104B_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC)

encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
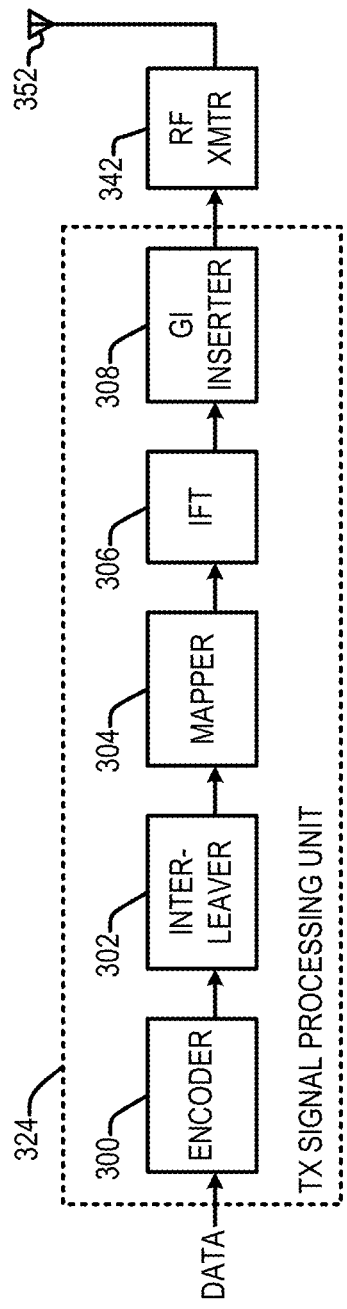
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
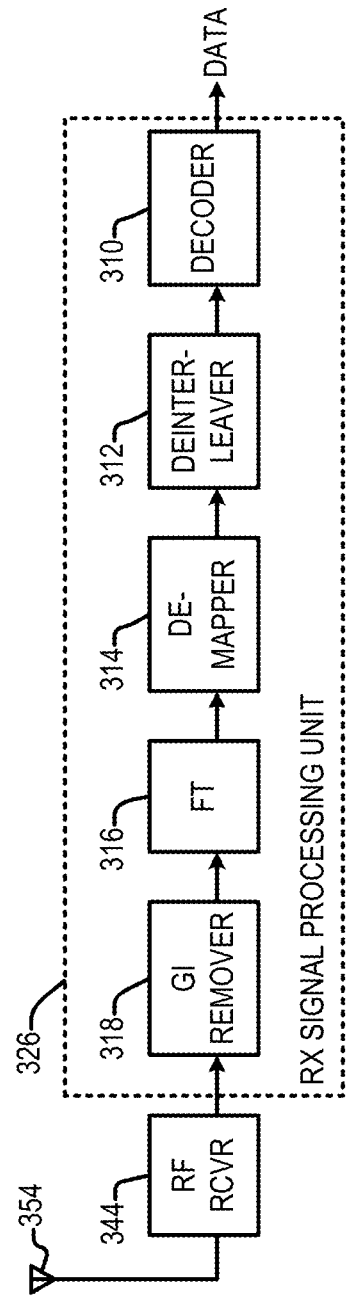
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, and 160 MHz contiguous channel widths and support for an 80+80 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
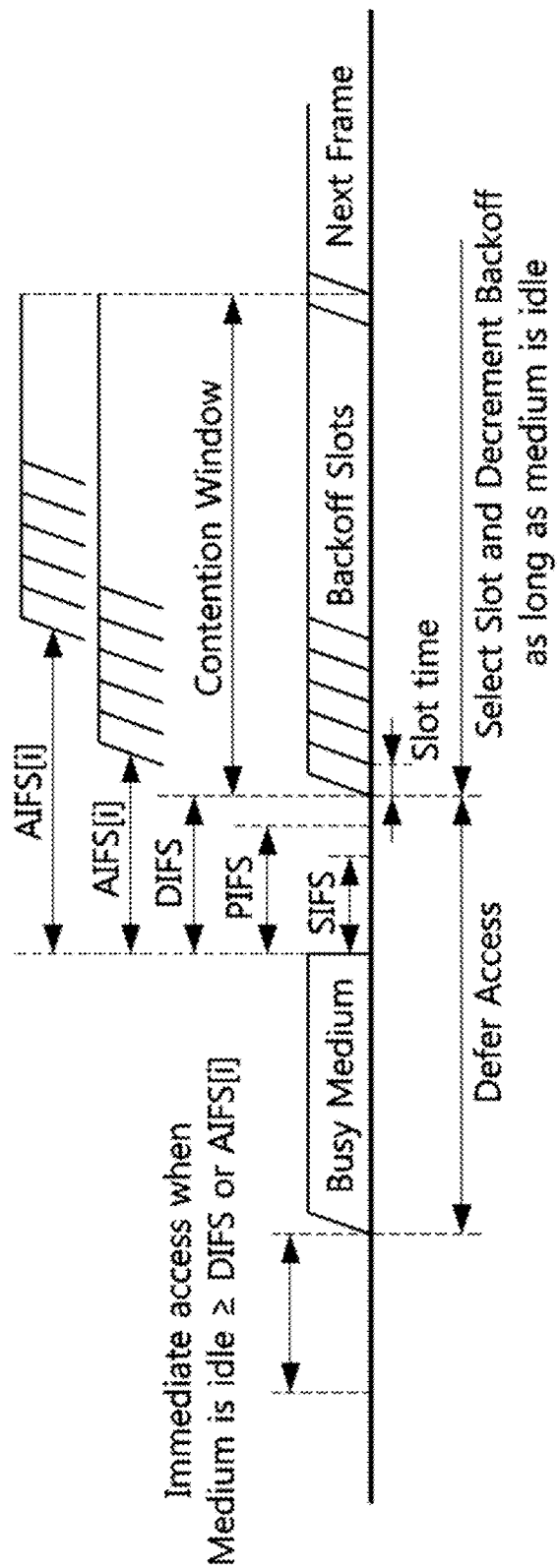
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
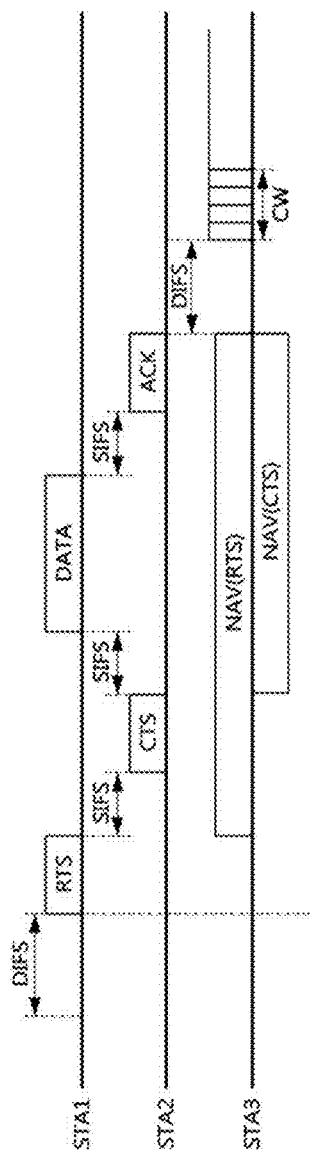
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+ SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Lager than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink(UL)/downlink(DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP coordination has been discussed as a possible technology to be adopted in IEEE 802.11be, where there is high level classification depending on various AP coordination schemes. For example, there is a first type of technique in which data for a user is sent from a single AP (sometimes referred to as "coordinated") or there is a second type of technique in which data for a user is sent from multiple APs (sometimes referred to as "joint").

For the coordinated AP technique, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. As for a joint AP technique, multiple APs are transmitting jointly to a given user.

Figure 9:
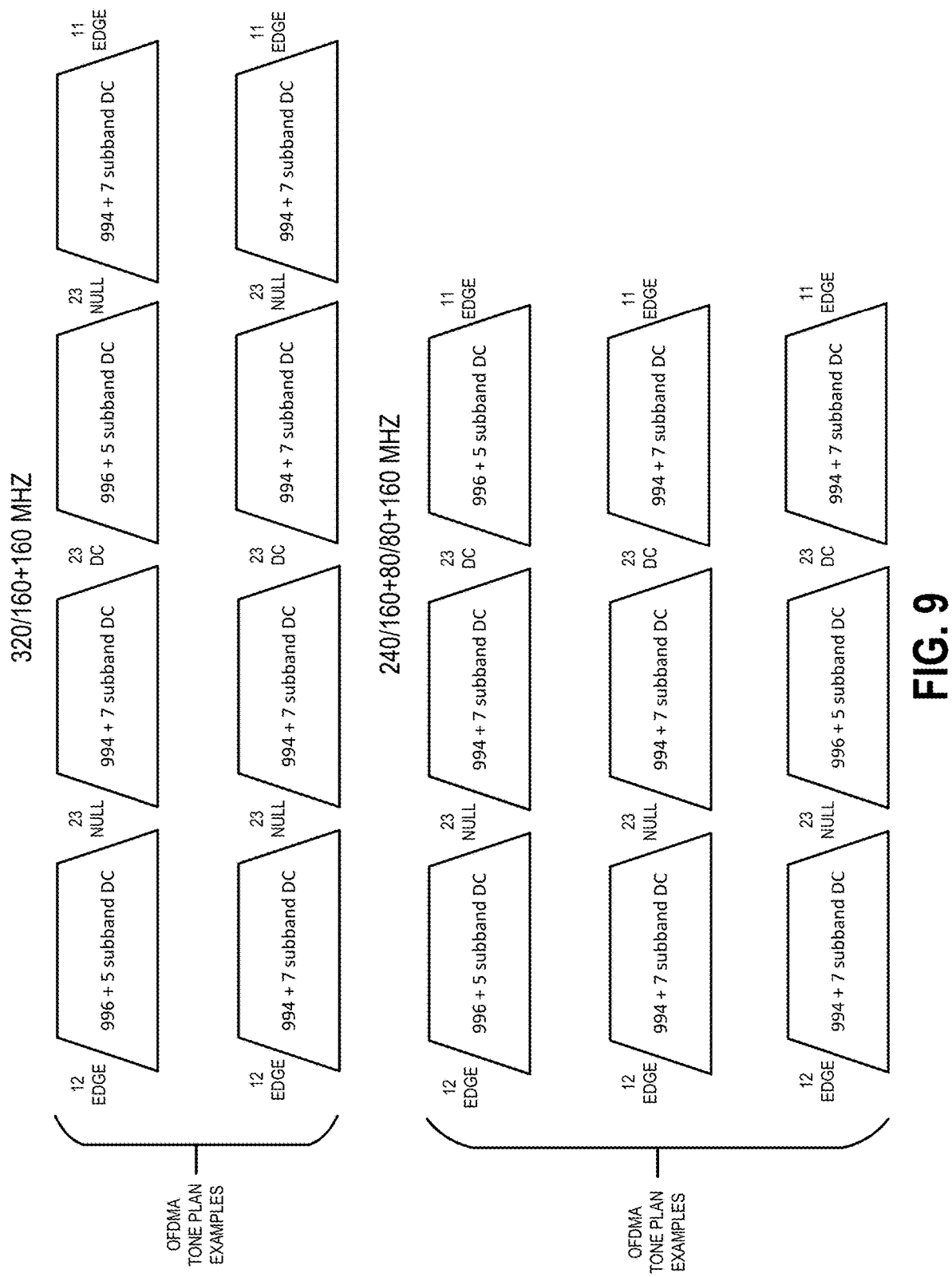
FIG. 9 shows an OFDMA numerology, in accordance with some embodiments of the present disclosure.

OFDMA numerology can be optimized depending on the design philosophy, considering tradeoffs between OFDMA gain and signaling overhead. Given an OFDMA numerology with limited flexibility, it might provide diversity gain without additional burdens/effects. For example, as shown in FIG. 8, some specific sizes and positions of resource units (RUs) are decided and corresponding BCC interleaver and LDPC tone mapper parameters are optimized for only given RUs. Those blocks could be extended for 160 MHz, 240 MHz, and 320 MHz bandwidths/transmissions as shown in the example of FIG. 9. RUs are building blocks for the scheduler to assign them 1) to different STAs and/or 2) some RUs to one STA in UL/DL OFDMA.

In particular, in FIG. 8 the 20 MHz OFDMA structure uses 26-tone RUs, 52-tone RUs, 106-tone RUs, and 242-tone RU at fixed positions. The 40 MHz OFDMA structure include two replicas of the 20 MHz structure. The 80 MHz OFDMA structure is two replicas of the 40 MHz structure on top of one central 26-tone. In some embodiments, the 80 MHz OFDMA structure can remove the center 26-tone RU (i.e., the pair of 13-tones on either side of the 7 DC tones). The 160 MHz OFDMA structure is two replicas of the 80 MHz structure. In FIG. 9, the 320 MHz and 160+160 MHz modes/structures are new bandwidth modes/structures. These structures are not merely replicas of the 160 MHz structure used in IEEE 802.11ax. The 80 MHz single user (SU) numerology with 996 usable tones and the 80 MHz OFDMA numerology with 994 usable tones are selectively used to support flexible OFDMA in IEEE 802.11be. Moreover, the 240 MHz, 160+80 MHz, and 80+160 MHz modes/structures could be new bandwidths modes/structures in IEEE 802.11be. These structures also use the 80 MHz OFDMA numerology with 994 usable tones and the 80 MHz SU numerology with 996 usable tones to support flexibility in IEEE 802.11be. Utilizing variable bandwidth modes (e.g., 240 MHz, 320 MHz, etc.) in IEEE 802.11be has many benefits, including better throughput and efficiency. Further, in the 6 GHz frequency band, adopting various bandwidth modes may be more beneficial to channel availability avoiding incumbent devices in 6 GHz, to diminish interference. In some embodiments, common and user specific fields, including sub-components like user fields, could be used to signal an EHT PPDU format within an EHT-SIG field.

Figure 10:
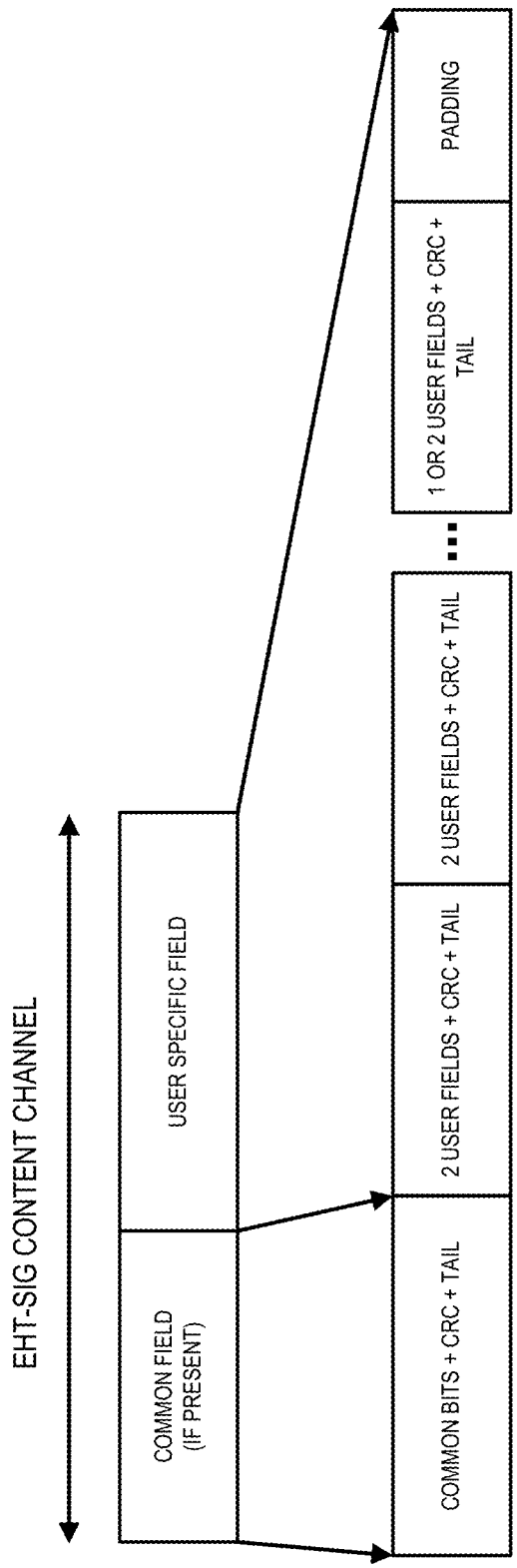
FIG. 10 shows an EHT signal content channel format, in accordance with some embodiments of the present disclosure.

The EHE-SIG field can provide OFDMA and DL MU-MIMO resource allocation information to allow STAs to look up the corresponding resources to be used in the EHT modulated fields of the PPDU (e.g., data fields). The EHT-SIG field of a 20 MHz (or 40 MHz) EHT PPDU contains one EHE-SIG content channel. The EHT-SIG field of an EHT PPDU that is 40 MHz (or 80 MHz) or wider could contain two EHT-SIG content channels. As example of an EHT-SIG content channel format is shown in FIG. 10, wherein the EHE-SIG content channel includes a common field, if present, followed by a user specific field. With some specific cases (e.g., a full bandwidth MU-MIMO transmission), the common field could not be present, and the EHT-SIG content channel includes only the user specific field. The common field of an EHT-SIG content channel contains information regarding resource unit allocation, such as RU assignment to be used in the EHT modulated fields of the PPDU, the RUs allocated for MU-MIMO, and the number of users in MU-MIMO allocations. The union of the user specific fields in the EHT-SIG content channels contains information for all users in the PPDU on how to decode their payload. As shown in FIG. 10, the user specific field of an EHT-SIG content channel includes zero or more user block fields followed by padding. Each user block field, except the final user block field is organized of user fields that contain information for STAs (e.g. up to two users fields for two STAs in FIG. 10) to decode each STA's payloads. The final user block field includes information depending on the number of users in the EHT-SIG content channel (e.g. one or two STAs in FIG. 10). For a full bandwidth MU-MIMO transmission case, in which no common field is present in a content channel, the number of users is indicated by another field in the EHT-SIG field and/or within the decoded data payloads.

In some embodiments, a resource allocation algorithm is described for non-continuous RUs in different operating bandwidths, such as 20 MHz, 40 MHz, . . . , 320 MHz. All different pairings of different size RUs are possibly assigned to a STA, such as [52-tone RU and 52-tone RU] or [106-tone RU and 242-tone RU] or more than two RUs with the same or different tone sizes. This configuration could provide diversity gain on a frequency selective fading channel. To support those flexible RU assignments, embodiments could include signaling methods and advanced segment parser designs. The equations below show an example of a segment parser in 160 MHz and 80+80 MHz BW modes.

Before the segment parser, the block of s bits is alternately assigned to different spatial streams in a round robin fashion. The number of bits assigned to a single axis (real or imaginary) in a constellation point in a spatial stream is denoted by Equation 1 below.

$$s = \max\left(1, \frac{N_{BPSCS}}{2}\right) \quad \text{Equation 1}$$

In Equation 1 above, $N_{BPSCS}$ is a number of coded bits per subcarrier, per spatial stream.

In some embodiments, for a 160 MHz or a 80+80 MHz transmission with a 2×996-tone RU, the output bits of each stream parser are first divided into blocks of $N_{CBPSS}$ bits (i.e., a number of coded bits per OFDM symbol per spatial stream ($N_{CBPSS}$)). Thereafter, each block is further divided into two frequency subblocks of $N_{CBPSS}/2$ bits, as shown in Equation 2 and Equation 3.

$$y_{k,l} = x_m \quad \text{Equation 2}$$

$$m = 2s \cdot \left\lfloor \frac{k}{s} \right\rfloor + l \cdot s + (k \mod s), k = 0, 1, \ldots, \frac{N_{CBPSS}}{2} - 1 \quad \text{Equation 3}$$

In the Equations 2 and 3 above, $x_m$ is bit m of a block of $N_{CBPSS}$ bits and m=0, . . . , $N_{CBPSS}$−1; l is the frequency subblock index and l=0,1; $y_{k,l}$ is bit k of the frequency subblock l, and s is defined in Equation 1.

In one embodiment, to support additional bandwidth modes, including one or more of 320 MHz, 160+160 MHz, 160+80+80 MHz, 80+160+80 MHz, 80+80+160 MHz, and 80+80+80+80 MHz with 4×996-tone RUs, the output block of a stream parser is further divided into four frequency subblocks of $N_{CBPSS}/4$, as given by Equation 4 and Equation 5.

$$y_{k,l} = x_m \quad \text{Equation 5}$$

$$m = 4s \cdot \left\lfloor \frac{k}{s} \right\rfloor + l \cdot s + (k \mod s), k = 0, 1, \ldots, \frac{N_{CBPSS}}{4} - 1 \quad \text{Equation 6}$$

In Equations 5 and 6, $x_m$ is bit m of a block of $N_{CBPSS}$ bits and m=0, . . . , $N_{CBPSS}$−1; l is a frequency subblock index and l=0,1,2 and 3; $y_{k,l}$ is bit k of the frequency subblock l; and s is defined by Equation 1.

Figure 11:
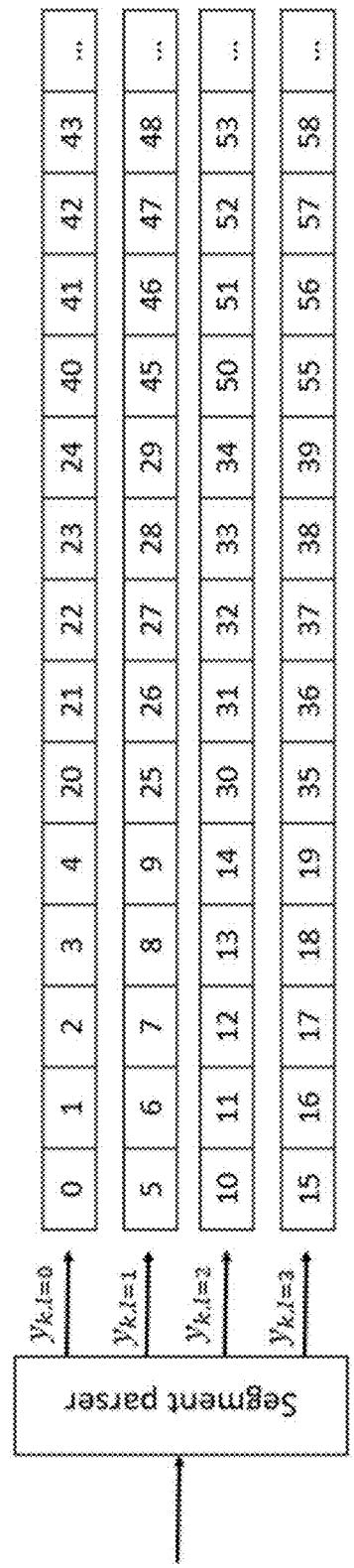
FIG. 11 shows an example of 4×996 tone resource units (RUs) segment parsed in 320 MHz, in accordance with some embodiments of the present disclosure.

For example, FIG. 11 shows an example of 4×996 tone RUs segment parsed in 320 MHz. In this example, $N_{BPSCS}$ has a value of 10 (e.g., 1024 QAM) and $N_{CBPSS}$ has a value of 39200. The output of the stream parser is parsed into the 4×996 tone RU portions in blocks of s bits. The value of s is defined by Equation 1.

In one embodiment, to support additional bandwidth modes, including one or more of 160+80 MHz, 80+160 MHz, 80+80+80 MHz with 3×996-tone RUs, the output block of a stream parser is further divided into three frequency subblocks of $N_{CBPSS}/3$ as given by Equation 6 and Equation 7.

$$y_{k,l} = x_m \quad \text{Equation 6}$$

$$m = 3s \cdot \left\lfloor \frac{k}{s} \right\rfloor + l \cdot s + (k \bmod s), k = 0, 1, \ldots, \frac{N_{CBPSS}}{3} - 1 \quad \text{Equation 7}$$

In Equations 5 and 6, $x_m$ is bit m of a block of $N_{CBPSS}$ bits and m=0, ..., $N_{CBPSS}$−1; l is a frequency subblock index and l=0,1, and 2; $y_{k,l}$ is bit k of the frequency subblock l; and s is defined by Equation 1.

In one embodiment, to support additional bandwidth modes, including one or more of 80, 160, 240, and 320 MHz based on a block of M-tone RU, wherein there are N RUs assigned to a STA with each the same size (e.g., same M-tone RU) and $N_{BPSCS}$ is a number of coded bits per subcarrier, per spatial stream. In this case, each block is further divided into N frequency subblocks of $N_{CBPSS}$/N bits as shown in Equation 8 and Equation 9.

$$y_{k,l} = x_m \quad \text{Equation 8}$$

$$m = N \cdot s \cdot \left\lfloor \frac{k}{s} \right\rfloor + l \cdot s + (k \bmod s), k = 0, 1, \ldots, \frac{N_{CBPSS}}{N} - 1 \quad \text{Equation 9}$$

In Equations 5 and 6, $x_m$ is bit m of a block of $N_{CBPSS}$ bits and m=0, ..., $N_{CBPSS}$−1; l is a frequency subblock index and l=0,1, ... N−1; $y_{k,l}$ is bit k of the frequency subblock l; s is defined by Equation 1; assigned RUs to a STA could use a same modulation level; M could be 26, 52, 106, 242, 484, or 996; N could be 2, 3, 4, ... $N_{max}$; $N_{max}$ could be a different value depending on M and operating bandwidth; and $N_{max}$ is 8 if 484-tone RUs are assigned in 320 MHz.

FIG. 12 shows an example of how two 106-tone RUs are assigned to a STA with segment parsing. In this example, $N_{BPSCS}$ has a value of 4 (e.g., 16 QAM) and $N_{CBPSS}$ has a value of 816. The output of the stream parser is parsed into the two 106-tone RU portions in blocks of s bits. The value of s is defined by Equation 1. The value of $y_{k,l}$ is from Equation 8 and the value of m is from Equation 9, when input N is 2.

In one embodiment, to support additional bandwidth modes, including one or more of 80, 160, 240, and 320 MHz based on a block of both M1-tone RUs and M2-tone RUs, wherein there are two RUs assigned to a STA with different tone sizes (M1<M2) and; each block is further divided into two frequency subblocks of $N_{CBPSS,M1}$ and $N_{CBPSS,M2}$ bits as shown in Equation 10 and Equation 11.

$$y_{k,l} = x_m \quad \text{Equation 10}$$

$$m = 2 \cdot s \cdot \left\lfloor \frac{k}{s} \right\rfloor + l \cdot s + (k \bmod s), k = 0, 1, \ldots, N_{CBPSS,M1} - 1 \quad \text{Equation 11}$$

only for $l = 1$: $m = 2 \cdot N_{CBPSS,M1} + k$, $k = N_{CBPSS,M1}, N_{CBPSS,M1} + 1, \ldots, N_{CBPSS,M2} - 1$ In Equations 10 and 11, $x_m$ is bit m of a block of $N_{CBPSS}$ bits, which is the sum of $N_{CBPSS,M1}$ and $N_{CBPSS,M2}$); m=0, ..., $N_{CBPSS}$−1; l is a frequency subblock RU index and l=0 and 1 for M1 and M2, respectively; $y_{k,l}$ is bit k of a frequency subblock l; and s is defined by Equation 1.

Figure 13:
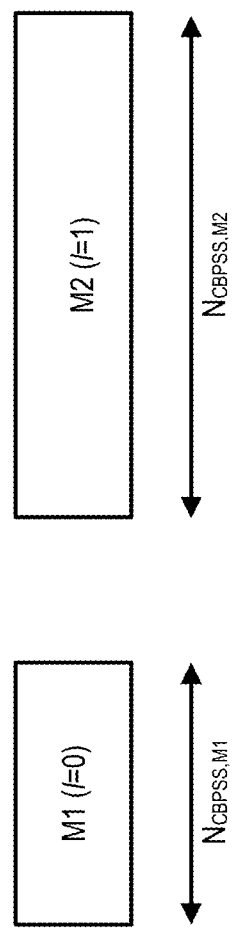
FIG. 13 shows two different RU allocations assigned for a STA in 80/160/240/320 MHz, in accordance with some embodiments of the present disclosure.

FIG. 13 shows two different RU allocations (e.g., M1<M2) assigned for a STA in 80/160/240/320 MHz. In one embodiment, to support additional bandwidth modes, including one or more of 80, 160, 240, and 320 MHz based on a block of both M1-tone RUs and M2-tone RUs, wherein there are two RUs assigned to a STA with different tone sizes (M1>M2) and $N_{CBPSS}$ is a number of coded bits per subcarrier, per spatial stream; each block is further divided into two frequency subblocks of $N_{CBPSS,M1}$ and $N_{CBPSS,M2}$ bits as shown in Equation 12 and Equation 13.

$$y_{k,l} = x_m \quad \text{Equation 12}$$

$$m = 2 \cdot s \cdot \left\lfloor \frac{k}{s} \right\rfloor + l \cdot s + (k \bmod s), k = 0, 1, \ldots, N_{CBPSS,M2} - 1 \quad \text{Equation 13}$$

only for $l = 1$: $m = 2 \cdot N_{CBPSS,M2} + k, k = 0, 1, 2, \ldots,$ $N_{CBPSS,M1} - N_{CBPSS,M2} - 1$ or $m = N_{CBPSS,M2} + k$, $k = N_{CBPSS,M2}, N_{CBPSS,M2} + 1, \ldots, N_{CBPSS,M1} - 1$ In Equations 12 and 13, $x_m$ is bit m of a block of $N_{CBPSS}$ bits, which is the sum of $N_{CBPSS,M1}$ and $N_{CBPSS,M2}$; m=0, ..., $N_{CBPSS}$−1; l is a frequency subblock RU index and l=0 and 1 for M1 and M2, respectively; $y_{k,l}$ is bit k of a frequency subblock l; and s is defined by Equation 1.

Figure 14:
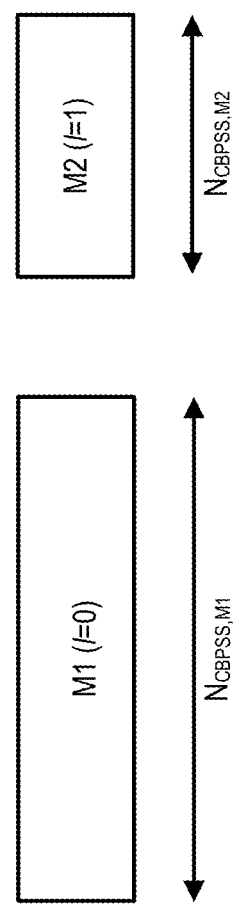
FIG. 14 shows two different RU allocations assigned for a STA in 80/160/240/320 MHz, in accordance with some embodiments of the present disclosure.

FIG. 14 shows two different RU allocations (e.g., M1>M2) assigned to a STA in 80/160/240/320 MHz. FIG. 15 shows an example of different 106-tone RU and 242-tone RU assigned to a STA in a segment parse. In this example, $N_{BPSCS}$ has a value of 4 (e.g., 16 QAM) and $N_{CBPSS,M1}$, $N_{CBPSS,M2}$ have values of 408 and 936, respectively. The output of the stream parser is parsed into the 106 tones and 242 tone RU portions in blocks of s bits. The value of s is from Equation 1. The value of $y_{k,l}$ is from Equation 10 and the value of m is from Equation 11. The same design concept of a segment parser could be applied to different size of RUs assigned to a STA to support different protocols. In some embodiments, the RUs have sizes of 52, 106, and 242 tones.

In one embodiment, to support additional bandwidth modes, including one or more of 80, 160, 240, and 320 MHz based on a block of three RUs, wherein there are three M1-tone, M2-tone, and M3-tone RUs assigned to a STA with different tone sizes (M1<M2<M3) and $N_{BPSCS}$ is a number of coded bits per subcarrier, per spatial stream; each block is further divided into three frequency subblocks of $N_{CBPSS,M1}$, $N_{CBPSS,M2}$ and $N_{CBPSS,M3}$ bits as shown in Equation 14 and Equation 15.

$$y_{k,l,r} = x_m \quad \text{Equation 14}$$

$$m = 3 \cdot s \cdot \left\lfloor \frac{k}{s} \right\rfloor + l \cdot s + (k \bmod s), k = 0, 1, \ldots, N_{CBPSS,M1} - 1 \quad \text{Equation 15}$$

only for $M2$ and $M3$: $m =$ $3 \cdot N_{CBPSS,M1} + 2 \cdot s \cdot \left\lfloor \frac{k - N_{CBPSS,M1}}{s} \right\rfloor + r \cdot s + (k \bmod s),$ $k = N_{CBPSS,M1}, N_{CBPSS,M1} + 1, \ldots, N_{CBPSS,M2} - 1,$ only for $M3$: $m =$ $3 \cdot N_{CBPSS,M1} + 2 \cdot (N_{CBPSS,M2} - N_{CBPSS,M1}) + k =$ $1 \cdot N_{CBPSS,M1} + 2 \cdot N_{CBPSS,M2} + k,$ $k = 0, 1, 2, \ldots, N_{CBPSS,M3} - N_{CBPSS,M2} - 1$ or $m = 3 \cdot N_{CBPSS,M1} + 2 \cdot (N_{CBPSS,M2} - N_{CBPSS,M1}) +$ $(k - N_{CBPSS,M2}) = 1 \cdot N_{CBPSS,M1} + 1 \cdot N_{CBPSS,M2} + k,$ $k = N_{CBPSS,M2}, N_{CBPSS,M2} + 1, \ldots, N_{CBPSS,M3} - 1$ In Equations 14 and 15, $x_m$ is bit m of a block of $N_{CBPSS}$ bits, which is the sum of $N_{CBPSS,M1}$, $N_{CBPSS,M2}$, and $N_{CBPSS,M3}$, and m=0, ..., $N_{CBPSS}$−1; l is the frequency subblock RU index and l=0, 1 and 2 for first RU, second RU, and third RU, respectively; r is the remaining frequency subblock RU index and r=0 and 1 for first remaining RU and second remaining RU; $y_{k,l,r}$ is bit k of the frequency subblock l and the remaining frequency subblock r; and s is defined by Equation 1.

FIG. 16 shows all cases of three different RU allocations assigned for a STA in 80/160/240/320 MHz.

Figure 17:
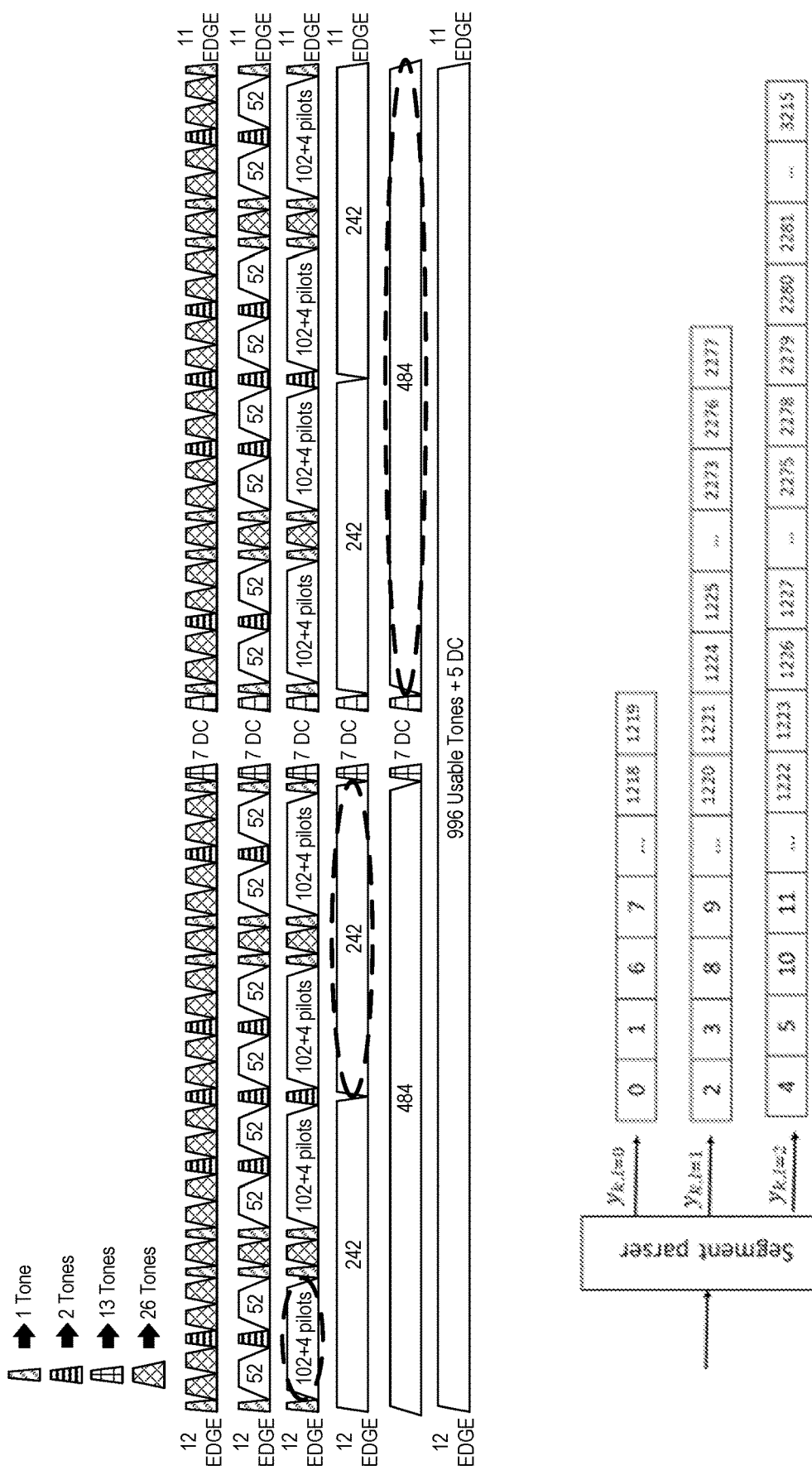
FIG. 17 shows an example of different 106-tone, 242-tone, and 484-tone RUs assigned to a STA in segment parse, in accordance with some embodiments of the present disclosure.

FIG. 17 shows an example of different 106-tone, 242-tone, and 484-tone RUs assigned to a STA in segment parse. In this example, $N_{BPSCS}$ has a value of 4 (e.g., 16 QAM) and $N_{CBPSS,M1}$, $N_{CBPSS,M2}$, $N_{CBPSS,M3}$ have values of 408, 936, and 1872, respectively. The output of the stream parser is parsed into the 106 tone, 242 tone, and 484 tone RU portions in blocks of s bits. The value of s is from Equation 1; the value of $y_{k,l,r}$ is from Equation 14; and the value of m is from Equation 15.

In some embodiments, a different number of assigned RUs and RU sizes can be used by modifying corresponding equations while still keeping the same principles and concepts.

As noted above, in some embodiments, a content channel (e.g., an EHT SIG content channel) includes signaling information to help decode a portion of multiple RUs assigned to a STA. The content channel (e.g., the EHT SIG content channel) includes a common field and a user specific field. The common field includes an RU allocation subfield and the user specific field includes a user field. In some embodiments, the RU allocation subfield has one or more bits (e.g., 8 bits) to indicate RU assignment to STAs and the user field has one or more bits (e.g., 11 bits) to indicate corresponding STA identifiers. When corresponding user fields have the same station identifier (STA-ID), the STA is assigned multiple RUs.

Figure 18:
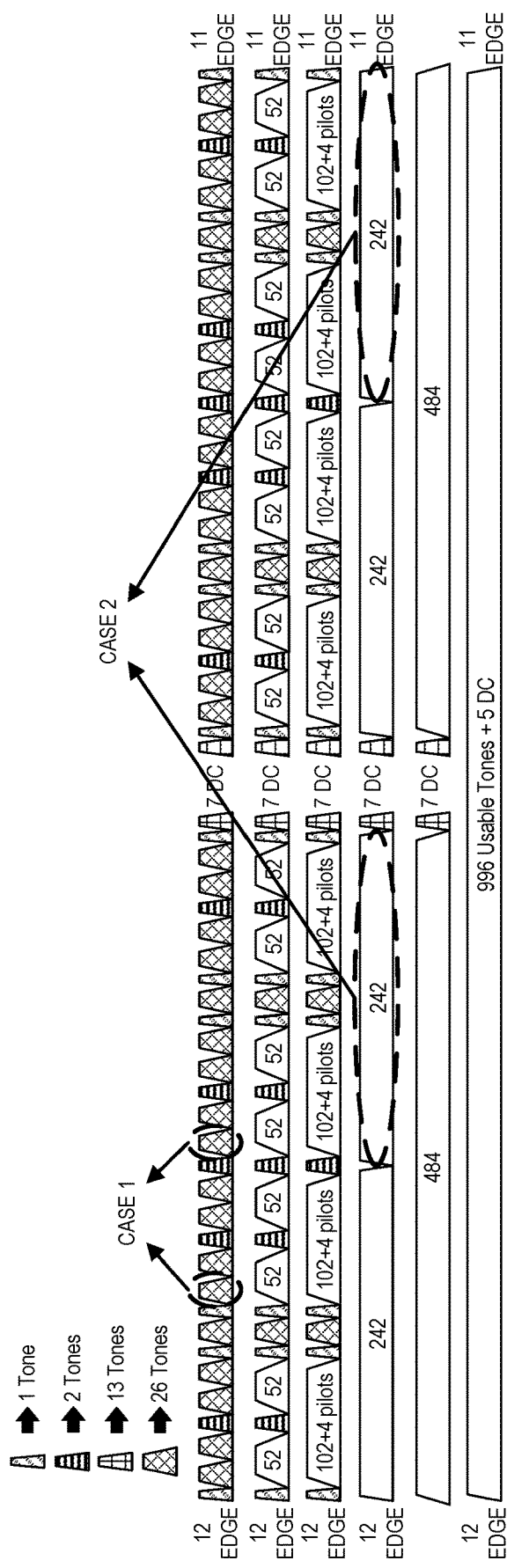
FIG. 18 shows a first example/case where two 26-tone RUs are assigned to a STA and a second example/case where two 242-tone RUs are assigned to a STA, in accordance with some embodiments of the present disclosure.

In some embodiments, to support flexible OFDMA RU allocation with low complexity application of a BCC interleaver and LDPC tone mapper for new RU sizes and to reduce the burden of changing hardware structures for legacy formats, a transmitter selects 1) the number of RUs (e.g., N RUs) and 2) sizes of RUs (e.g., M tones) to be assigned to a receiver such that a BCC interleaver or LDPC tone mapper is to cover N×M tones. FIG. 18 shows an example (Case 1) where two 26-tone RUs are assigned to a STA with the use of a 52-tone RU interleaver (e.g., a BCC interleaver used for IEEE 802.11ax). FIG. 18 also shows an example where two 242-tone RUs are assigned to a STA with the use of a 484-tone RU interleaver (e.g., an LDPC tone mapper used for IEEE 802.11ax).

In one embodiment, to support flexible OFDMA RU allocation to a STA, data to be transmitted is selectively applied to each assigned RU to efficiently earn performance gain according to channel, data size, etc. In some embodiments, different data could be assigned to each RU to earn the frequency diversity gain and/or data could be assigned (e.g., duplicated) to each RU to earn MRC gain.

In some embodiments, an EHT SIG content channel includes control information to indicate a data type for multiple RUs assigned to a STA. In these embodiments, the EHT SIG content channel includes a common field and a user specific field. In some embodiments, a user field in the user specific field includes first information bits (e.g., one or more bits) for a non-MU-MIMO allocation to indicate that assigned RUs are duplicated. For example, when the first information bits are set to a first state (e.g., 1), this indicates that the data assigned/within the RUs are duplicated. Where the first information bits are set to a second state (e.g., 0), this indicates that the data assigned to RUs are different (i.e., non-duplicated).

In some embodiments, a user field in the user specific field includes first information bits (e.g., one or more bits) for a MU-MIMO allocation to indicate that assigned RUs are duplicated. For example, when the first information bits are set to a first state (e.g., 1), this indicates that the data assigned/within the RUs are duplicated. Where the first information bits are set to a second state (e.g., 0), this indicates that the data assigned to RUs are different (i.e., non-duplicated). In some embodiments, the user field in the EHT SIG content channel could include 10-bits for a STA identifier.

Figure 19:
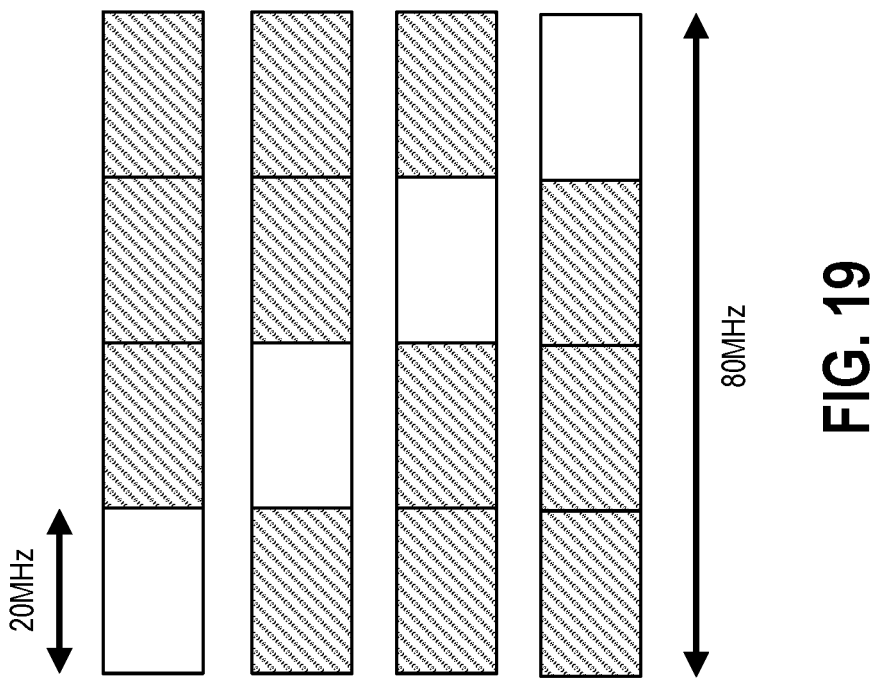
FIG. 19 shows a 60 MHz transmission with 20 MHz punctured in a 80 MHz bandwidth, in accordance with some embodiments of the present disclosure.
Figure 20:
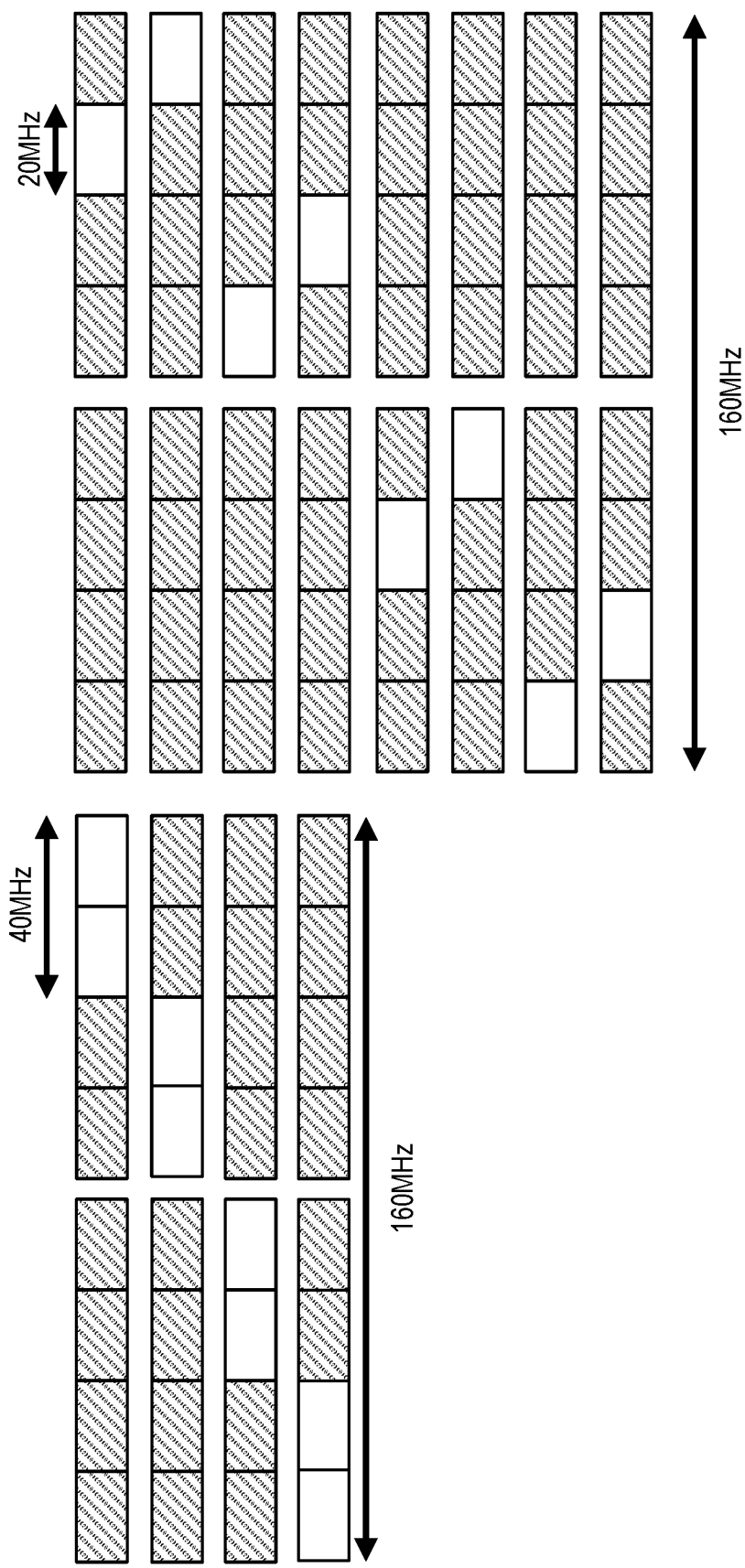
FIG. 20 shows a 120/140 MHz transmission with 40/20 MHz punctured in a 160 MHz bandwidth, in accordance with some embodiments of the present disclosure.
Figure 21:
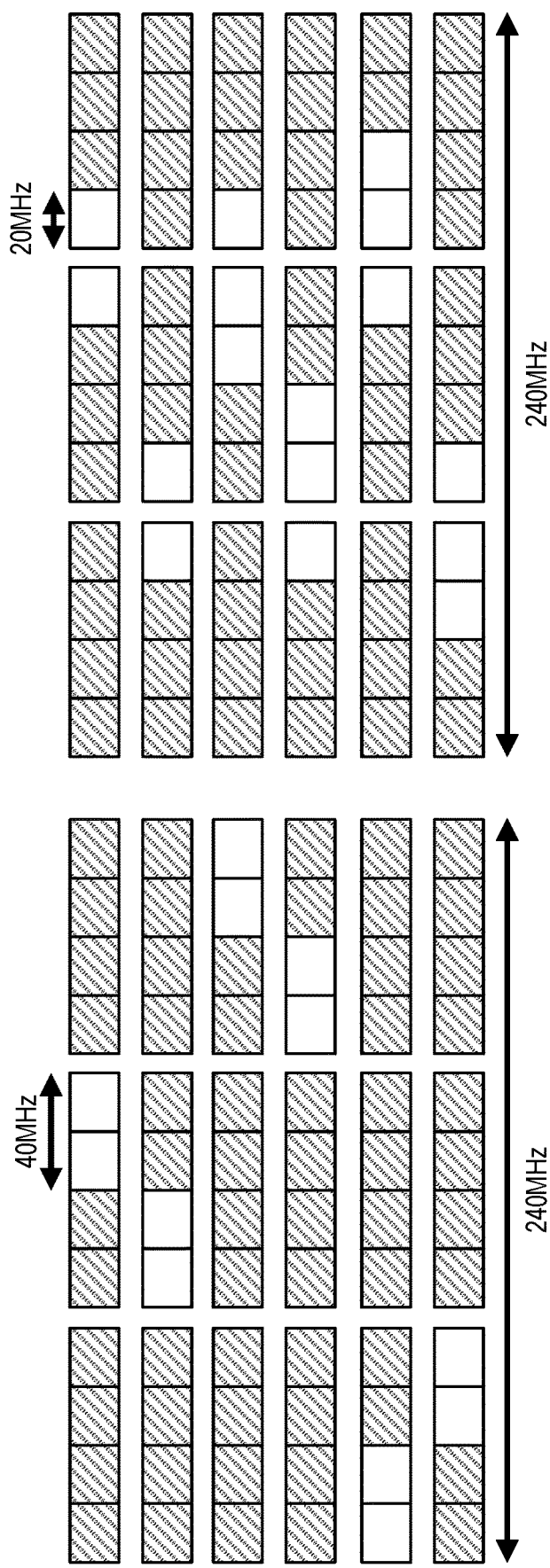
FIG. 21 shows a 180/200 MHz transmission with 60/40 MHz punctured in a 240 MHz bandwidth, in accordance with some embodiments of the present disclosure.
Figure 22:
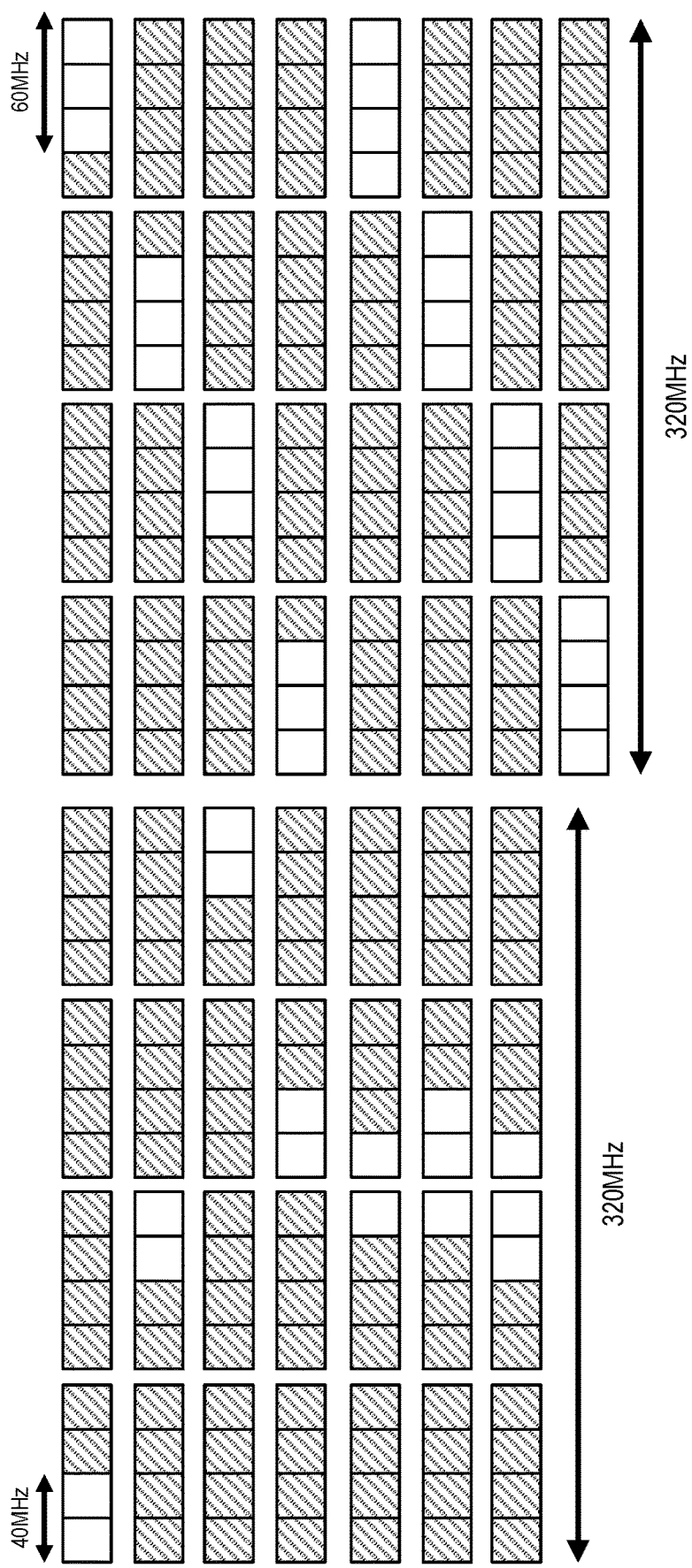
FIG. 22 shows a 240/260/280 MHz transmission with 80/60/40 MHz punctured in a 320 MHz bandwidth, in accordance with some embodiments of the present disclosure.

Considering large bandwidths, such as 80/160/240/320 MHz, depending on channel conditions and certain circumstances, the chance to use the entire bandwidth may not seem high as part of the channel could be unavailable or otherwise not suited for transmissions. To increase the efficiency and effective throughput, puncturing some portion of the entire bandwidth could be a good approach for SU transmission and full bandwidth MU-MIMO transmission. The preamble puncturing resolution could be per 20 MHz. For example, for a 80 MHz transmission with preamble punctured, FIG. 19 shows a 60 MHz transmission with 20 MHz punctured in a 80 MHz bandwidth. Similarly, for a 160 MHz transmission with preamble punctured, FIG. 20 shows a 120/140 MHz transmission with 40/20 MHz punctured in a 160 MHz bandwidth. Also, for a 240 MHz transmission with preamble punctured, FIG. 21 shows a 180/200 MHz transmission with 60/40 MHz punctured in a 240 MHz bandwidth. Lastly, for a 320 MHz transmission with preamble punctured, FIG. 22 shows a 240/260/280 MHz transmission with 80/60/40 MHz punctured in a 320 MHz bandwidth.

Figure 23:
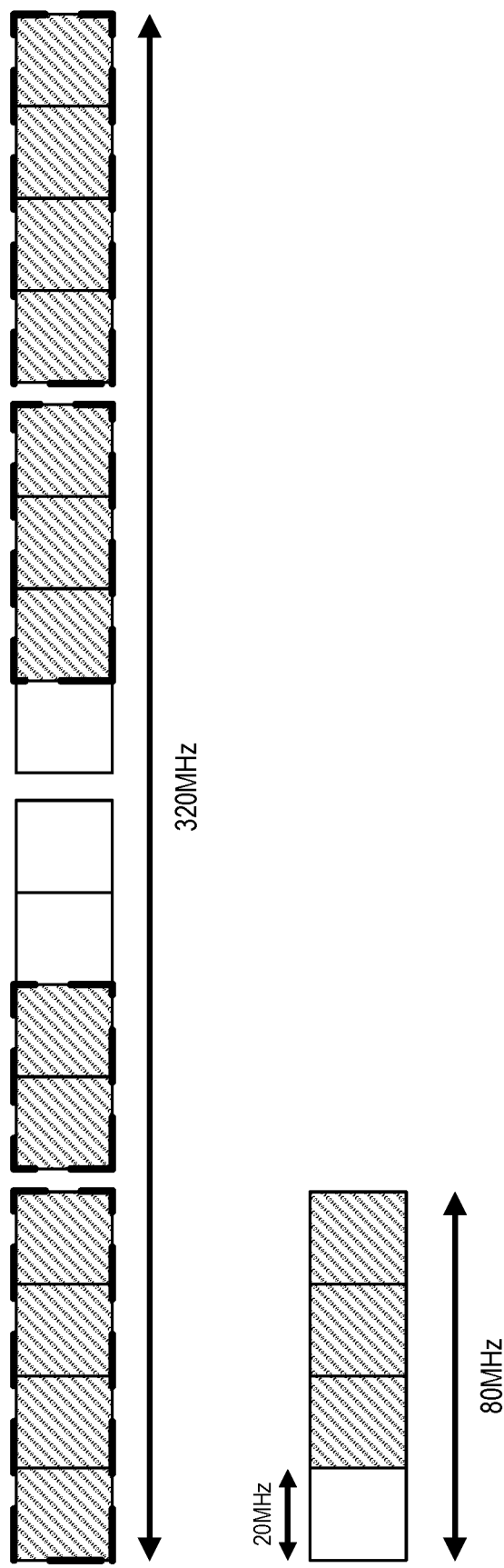
FIG. 23 shows an X-tone RU to support approximate 60 MHz transmission, in accordance with some embodiments of the present disclosure.

To support easy implementation and extension to next generation wireless networks, reuse of OFDMA numerology would provide simplicity. However, observing the relatively flexible puncturing patterns, some modification would provide more benefits, such as new RU sizes. In some embodiments, only when puncturing may be applied for transmission of one or more RUs, first control information indicates puncturing information and is set to one of a plurality of states. The first control information can be control information corresponding to use of puncturing or corresponding to a bandwidth indication, including whether puncturing is applied. For example, a bandwidth field could indicate one of an 80 MHz bandwidth or an 80 MHz bandwidth with some 20 MHz subchannels punctured. In one embodiment, a new RU could be an X-tone RU to support approximate 60 MHz transmission as shown in FIG. 23. To support a 60 MHz block, a segment parser that combines 20 MHz and 40 MHz segments parsers can be implemented.

Figure 24:
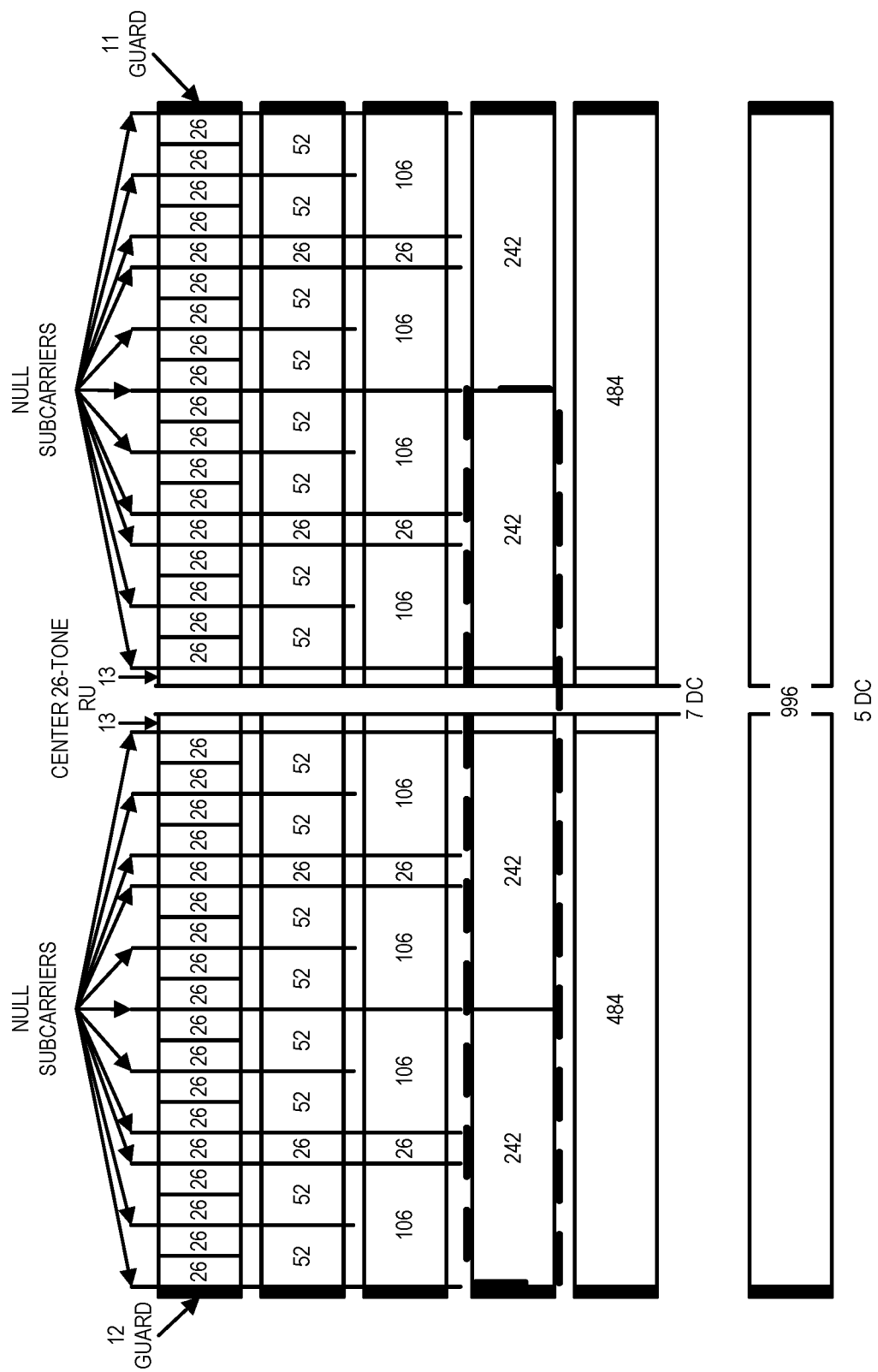
FIG. 24 shows a 484+26+242 tone RU, in accordance with some embodiments of the present disclosure.

To support new/different RU sizes, range and pilot tones on top of BCC interleaver and LDPC tome mapper design needs to be examined. In one embodiment, a 484+26+242 tone RU may be used. As shown in FIG. 24, this RU includes a 26-tone RU. Further, the subcarrier range could be [−500:−4, 4:258] and pilot indices could be {−468, −400, −334, −266, −226, −158, −92, −24, 24, 92, 158, 226}. Alternatively, the subcarrier range could be [−258:−4, 4:500] and the pilot indices could be {−226, −158, −92, −24, 24, 92, 158, 226, 266, 334, 400, 468}.

Figure 25:
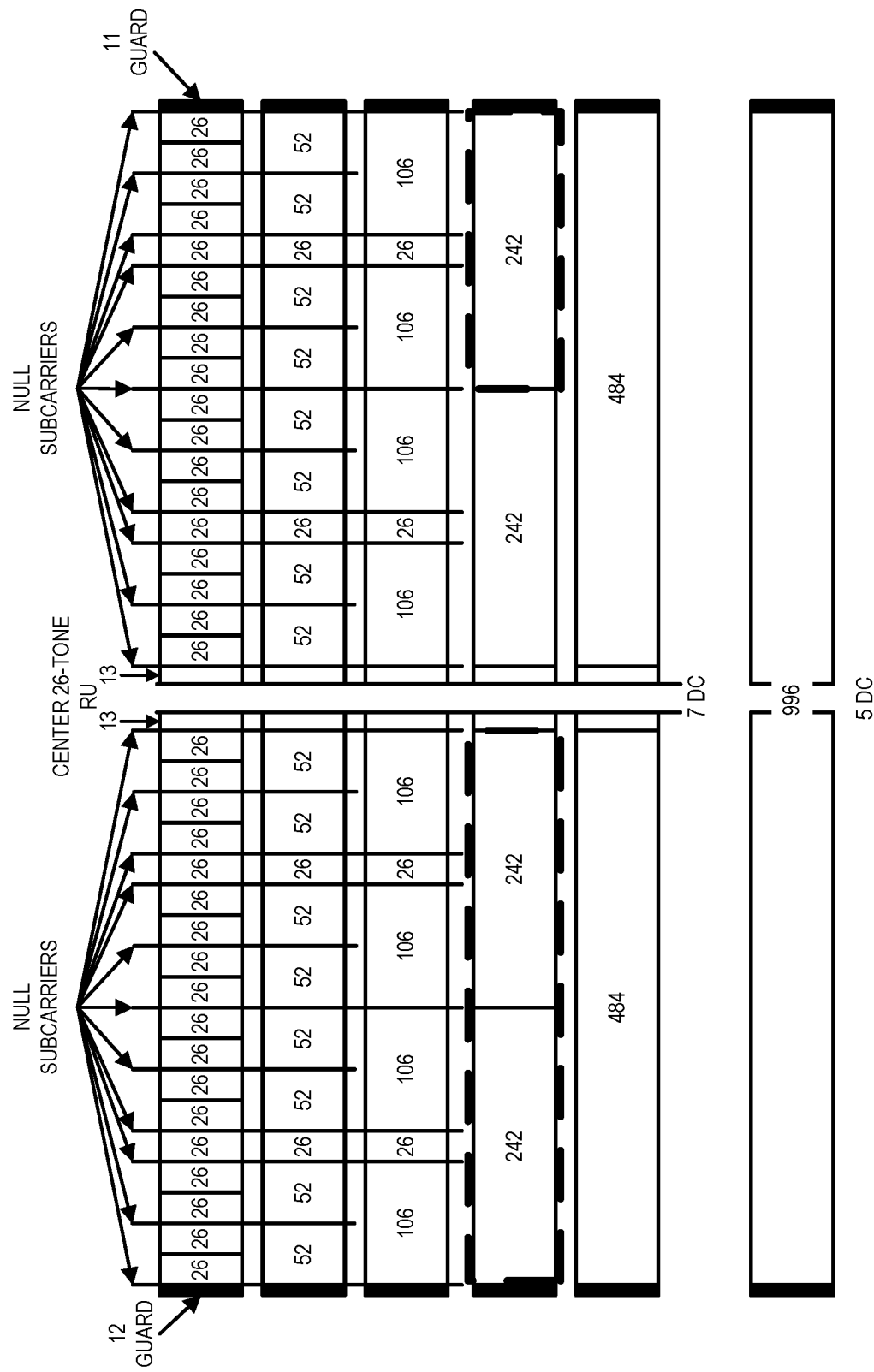
FIG. 25 shows a 484+242 tone RU, in accordance with some embodiments of the present disclosure.

In one embodiment, a 484+242 tone RU may be used. As shown in FIG. 25, this RU does not include a 26-tone RU. Further, the subcarrier range could be [−500:−17, 17:258] and pilot indices could be {−468, −400, −334, −266, −226, −158, −92, −24, 24, 92, 158, 226}. Alternatively, the subcarrier range could be [−500:−17, 259:500] and the pilot indices could be {−468, −400, −334, −266, −226, −158, −92, −24, 266, 334, 400, 468}. In another embodiment, the subcarrier range could be [−258:−17, 17:500] and the pilot indices could be {−226, −158, −92, −24, 24, 92, 158, 226, 266, 334, 400, 468}. In still another embodiment, the subcarrier range could be [−500:−259, 17:500] and the pilot indices {−468, −400, −334, −266, 24, 92, 158, 226, 266, 334, 400, 468}.

FIG. 26 shows tone mapping parameters (i.e., a tone mapping distance $D_{TM}$) for an LDPC tone mapper and various RU sizes. In this example, B could be 13 or 14, a number of data subcarriers per frequency segment ($N_{SD}$) could be 728, and a number of pilot subcarriers per frequency segment ($N_{SP}$) could be 24. Further, A could be 13 or 18, a number of data subcarriers per frequency segment ($N_{SD}$) could be 702, and a number of pilot subcarriers per frequency segment ($N_{SP}$) could be 24. The new RUs described herein and corresponding parameters can be used for corresponding segment or RU parsers.

In the case of multiple RUs with different lengths/sizes, a segment or RU parser with a longer length will end up with leftover tones. For example, for a RU484 and a RU996, to be combined, assigning the tones with a $N_{BPSCS}/2$-coded-bit round robin of even distribution between segments or RUs, when a 468 segment is filled up first, all the remaining 512 tones (i.e., 980-468) are distributed to the remaining segment. This can cause some loss without frequency diversity because large portions (about ⅓ in this example) are not interleaved in a round robin fashion.

To increase the portion distributed with a round robin approach, proportional round robin could be supported. For example, $r_0 N_{BPSCS}/2$ coded bits are assigned to a first segment followed by $r_1 N_{BPSCS}/2$ assigned to a second segment, where $r_0$ and $r_1$ are ratios (or approximate ratios) between the length/size of the first segment and the second segment. All the remaining bits are proportionally distributed in a round robin fashion when more than two segments are assigned. Accordingly, the portion distributed in a proportional round robin fashion should be increased as much as possible to increase performance.

A proportional round robin method according to one example embodiment is shown in FIG. 27. As shown, for RU484+RU996 and RU484+RU996+RU996, an approximate ratio based on each $N_{SD}$ for the RU484 and RU996 is 1:2 and there are 44 leftover tones on the longer segment(s). Considering s, max(1, $N_{BPSCS}/2$), s and 2s are distributed on each segment. When there are more than two segments, for longer segments, 2s and 2s are evenly distributed.

Figure 28:
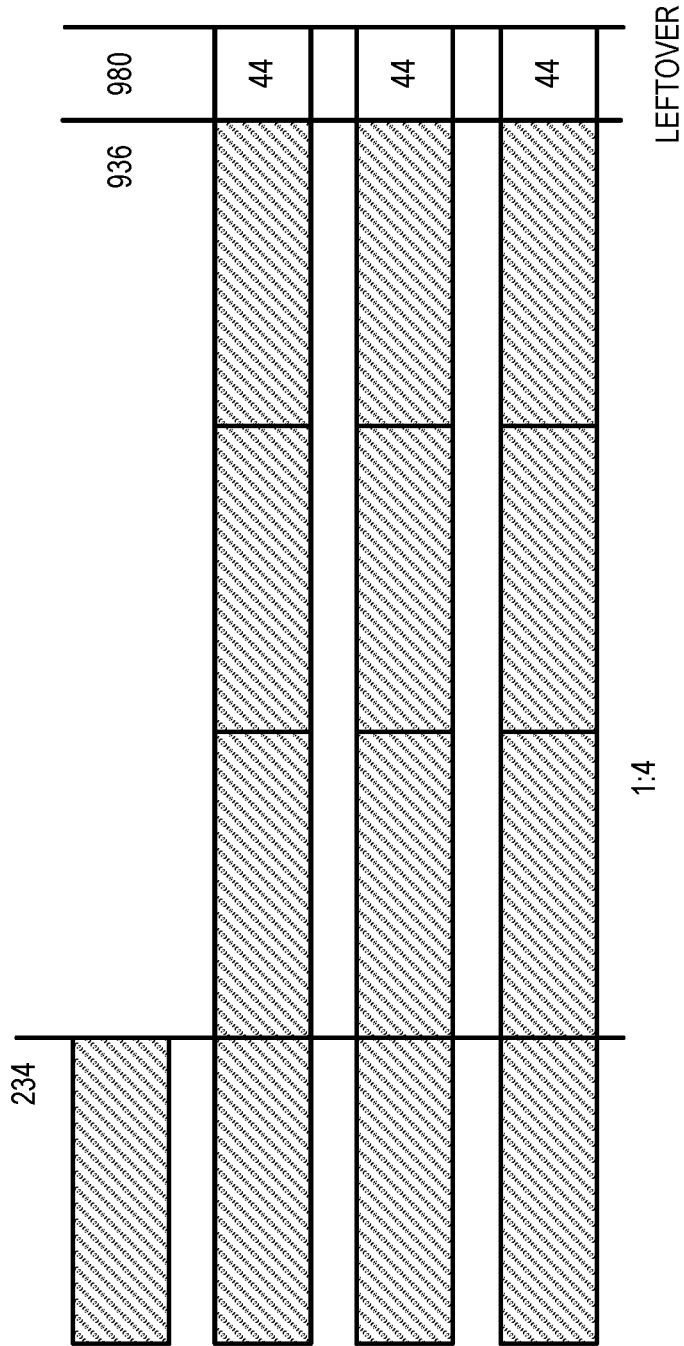
FIG. 28 shows a proportional round robin method in segment parse, in accordance with some embodiments of the present disclosure.

Another proportional round robin method according to another example embodiment is shown in FIG. 28. As shown, for a RU242+RU996+RU996+RU996, an approximate ratio based on each $N_{SD}$ for RU242 and RU996 is 1:4 and there are 44 leftover tones on the longer segment(s). Considering s, max(1, $N_{BPSCS}/2$), s and 4s are distributed on each segment. For longer segments, 4s, 4s, and 4s are evenly distributed.

Figure 29:
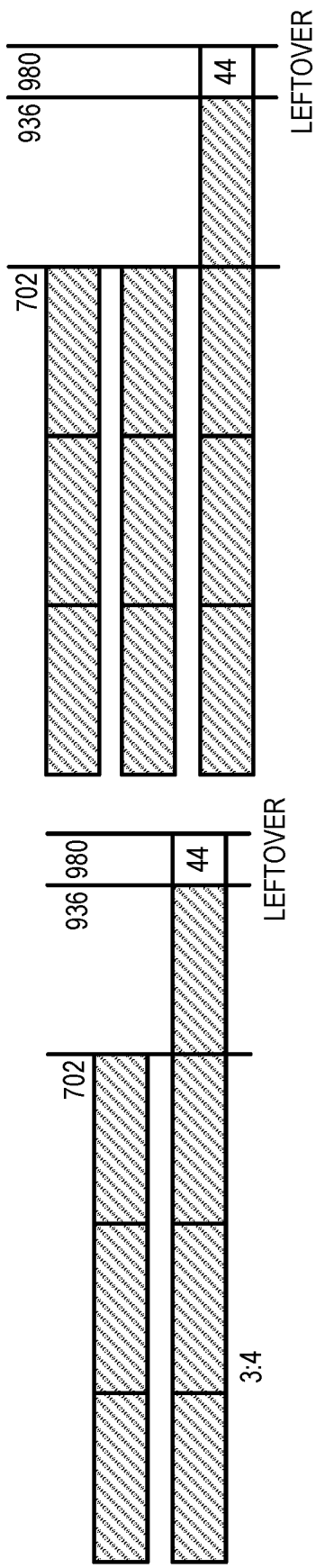
FIG. 29 shows a proportional round robin method in segment parse, in accordance with some embodiments of the present disclosure.

Another proportional round robin method according to another example embodiment is shown in FIG. 29. As shown, for RU726+RU996 and RU726+RU996+RU996, an approximate ratio based on each $N_{SD}$ for RU726 and RU996 is 3:4 and there are 44 leftover tones on the longer segment(s). Considering s, max(1, $N_{BPSCS}/2$), s and 4s are distributed on each segment.

The methods/technique described above can be supported by Equations 17 and 18 shown below.

$$\text{For } l = 0 \qquad \text{Equation 17}$$
$$s \cdot (r_0 + r_1) \left\lfloor \frac{k}{s \cdot r_0} \right\rfloor + \mod(k, s \cdot r_0)$$
$$k = 0, 1, \ldots, (N_1 - 1)$$
$$\text{For } l = 1$$
$$s \cdot (r_0 + r_1) \left\lfloor \frac{k}{s \cdot r_1} \right\rfloor + s \cdot r_0 + \mod(k, s \cdot r_1)$$
$$k = 0, 1, \ldots, \left( \frac{N_1 - r_1}{r_0} - 1 \right)$$

For leftover tones over a longer segment, Equation 18 may be used.

$$\left( s \cdot (r_0 + r_1) \left\lfloor \frac{i}{s \cdot r_1} \right\rfloor + s \cdot r_0 + \mod(i, s \cdot r_1) \right)_{i = \frac{N_1 \cdot r_1}{r_0} - 1} + \qquad \text{Equation 18}$$
$$1 + s \cdot r_1 \left\lfloor \frac{k - \frac{N_1 r_1}{r_0}}{s \cdot r_1} \right\rfloor + \mod\left( k - \frac{N_1 \cdot r_1}{r_0}, s \cdot r_1 \right) k =$$
$$\frac{N_1 \cdot r_1}{r_0}, \ldots, (N_2 - 1)$$

As examples of two segments ($l=0$, $l=1$) with RU996+RU996 ($r_0=1$, $r_1=1$), RU484+RU996 ($r_0=1$, $r_1=2$) and RU726+RU996 ($r_0=3$, $r_1=4$) can be used. In these examples, length of ($l=1$) is equal to or longer than length of ($l=0$), but RU996+RU726 follows the same rule.

Both $N_1$ and $N_2$ are given as a shorter segment length and a longer segment length, respectively. Accordingly, $N_1$-$N_n$ are provided by Equation 19 below.

$$N_1 = N_{CBPSS,RU1} = N_{SD,RU1} \times N_{bpscs}, \qquad \text{Equation 19}$$
$$\text{where}$$
$$N_{SD,RU1} \text{ is the number of complex data numbers of } RU1$$
$$N_2 = N_{CBPSS,RU2} = N_{SD,RU2} \times N_{bpscs},$$
$$\text{where}$$
$$N_{SD,RU2} \text{ is the number of complex data numbers of } RU2$$
$$\ldots$$
$$N_n = N_{CBPSS,RUn} = N_{SD,RUn} \times N_{bpscs},$$
$$\text{where}$$
$$N_{SD,RUn} \text{ is the number of complex data numbers of } RUn$$

In the above, $N_{bpscs}=[1, 2, 4, 6, 8, 10]$ correspond to BPSK, QPSK, 16 QAM, 64 QAM, 256 QAM and 1024 QAM and s is the number of bits in a real/imaginary axis of a constellation.

The methods/technique described above can be supported by Equations 20-22 shown below. As examples of three segments ($l=0$, $l=1$, $l=2$) with RU996+RU996+RU996 ($r_0=1$, $r_1=1$, $r_2=1$), RU484+RU996+RU996 ($r_0=1$, $r_1=2$, $r_2=2$) and RU726+RU726+RU996 ($r_0=3$, $r_1=3$, $r_2=4$) can be used. In these examples, the length of ($l=2$) is equal to or longer than length of ($l=1$) and length of ($l=1$) is equal to or longer than length of ($l=0$). However, RU996+RU484+RU996, RU996+RU996+RU484, RU726+RU996+RU726, or RU996+RU726+RU726 can follow the same rule as shown in Equation 20.

For $l = 0$   Equation 20

$$s \cdot (r_0 + r_1 + r_2) \left\lfloor \frac{k}{s \cdot r_0} \right\rfloor + \mathrm{mod}(k, s \cdot r_0)$$

$$k = 0, 1, \ldots, (N_1 - 1)$$

For $l = 1$ $$s \cdot (r_0 + r_1 + r_2) \left\lfloor \frac{k}{s \cdot r_1} \right\rfloor + s \cdot r_0 + \mathrm{mod}(k, s \cdot r_1)$$

$$k = 0, 1, \ldots, \left( \frac{N_1 \cdot r_1}{r_0} - 1 \right)$$

For $l = 2$ $$s \cdot (r_0 + r_1 + r_2) \left\lfloor \frac{k}{s \cdot r_2} \right\rfloor + s \cdot (r_0 + r_1) + \mathrm{mod}(k, s \cdot r_2)$$

$$k = 0, 1, \ldots, \left( \frac{N_1 \cdot r_2}{r_0} - 1 \right)$$

For leftover tones over the longer two segments, Equation 21 may be used.

For $l = 1$   Equation 21

$$\left( s \cdot (r_0 + r_1 + r_2) \left\lfloor \frac{k}{s \cdot r_1} \right\rfloor + s \cdot r_0 + \mathrm{mod}(k, s \cdot r_1) \right)_{k = \frac{N_1 \cdot r_1}{r_0} - 1} +$$

$$1 + s \cdot r_2 + s \cdot (r_1 + r_2) \left\lfloor \frac{k - \frac{N_1 \cdot r_1}{r_0}}{s \cdot r_1} \right\rfloor + \mathrm{mod}\left( k - \frac{N_1 \cdot r_1}{r_0}, s \cdot r_1 \right)$$

$$k = \frac{N_1 \cdot r_1}{r_0}, \ldots, (N_2 - 1)$$

For $l = 2$ $$(s \cdot (r_0 + r_1 + r_2) \left\lfloor \frac{k}{s \cdot r_2} \right\rfloor + s \cdot (r_0 + r_1) +$$

$$\mathrm{mod}(k, s \cdot r_2))_{k = \frac{N_1 \cdot r_2}{r_0} - 1} + 1 + s \cdot r_1 +$$

$$s \cdot (r_1 + r_2) \left\lfloor \frac{k - \frac{N_1 \cdot r_2}{r_0}}{s \cdot r_2} \right\rfloor + \mathrm{mod}\left( k - \frac{N_1 \cdot r_2}{r_0}, s \cdot r_2 \right)$$

$$k = \frac{N_1 \cdot r_2}{r_0}, \ldots, (N_3 - 1)$$

For leftover tones over the longer segment, Equation 22 may be used.

For $l = 2$   Equation 22

$$(s \cdot (r_0 + r_1 + r_2) \left\lfloor \frac{k}{s \cdot r_2} \right\rfloor +$$

$$s \cdot (r_0 + r_1) + \mathrm{mod}(k, s \cdot r_2))_{k = \frac{N_1 \cdot r_2}{r_0} - 1} + 1 +$$

$$s \cdot r_2 \left\lfloor \frac{k - \frac{N_2 \cdot r_2}{r_1}}{s \cdot r_2} \right\rfloor + \mathrm{mod}\left( k - \frac{N_2 \cdot r_2}{r_1}, s \cdot r_2 \right)$$

$$k = \frac{N_2 \cdot r_2}{r_1}, \ldots, (N_3 - 1)$$

If some of r0, r1, and r2 have the same number, corresponding equations could be simplified. For example, when RU484 is combined with two RU996 to be transmitted with r0 and r1, Equation 23 can be used.

For $l = 0$   Equation 23

$$s \cdot (r_0 + 2r_1) \left\lfloor \frac{k}{s \cdot r_0} \right\rfloor + \mathrm{mod}(k, s \cdot r_0)$$

$$k = 0, 1, \ldots, (N_1 - 1)$$

For $l = 1$ $$s \cdot (r_0 + 2r_1) \left\lfloor \frac{k}{s \cdot r_1} \right\rfloor + s \cdot r_0 + \mathrm{mod}(k, s \cdot r_1)$$

$$k = 0, 1, \ldots, \left( \frac{N_1 \cdot r_1}{r_0} - 1 \right)$$

For $l = 2$ $$s \cdot (r_0 + 2r_1) \left\lfloor \frac{k}{s \cdot r_1} \right\rfloor + s \cdot (r_0 + r_1) + \mathrm{mod}(k, s \cdot r_1)$$

$$k = 0, 1, \ldots, \left( \frac{N_1 \cdot r_1}{r_0} - 1 \right)$$

In the case of leftover tones over the last two segments $l_1$ and $l_2$, Equation 24 can be used.

For $l = 1$   Equation 24

$$\left( s \cdot (r_0 + 2r_1) \left\lfloor \frac{k}{s \cdot r_1} \right\rfloor + s \cdot r_0 + \mathrm{mod}(k, s \cdot r_1) \right)_{k = \frac{N_1 \cdot r_1}{r_0} - 1} + 1 +$$

$$s \cdot r_1 + s \cdot 2r_1 \left\lfloor \frac{k - \frac{N_1 \cdot r_1}{r_0}}{s \cdot r_1} \right\rfloor + \mathrm{mod}\left( k - \frac{N_1 \cdot r_1}{r_0}, s \cdot r_1 \right)$$

For $l = 2$ $$\left( s \cdot (r_0 + 2r_1) \left\lfloor \frac{k}{s \cdot r_2} \right\rfloor + s \cdot (r_0 + r_1) + \mathrm{mod}(k, s \cdot r_1) \right)_{k = \frac{N_1 \cdot r_1}{r_0} - 1} +$$

$$1 + s \cdot 2r_1 \left\lfloor \frac{k - \frac{N_1 \cdot r_1}{r_0}}{s \cdot r_1} \right\rfloor + \mathrm{mod}\left( k - \frac{N_1 \cdot r_1}{r_0}, s \cdot r_1 \right)$$

$$k = \frac{N_1 \cdot r_1}{r_0}, \ldots, (N_2 - 1)$$

If some of r0, r1, and r2 have the same number, the corresponding equations could be simplified. For example, when two RU726 and one RU996 are combined to be transmitted with r0 and r1, Equation 25 can be used (e.g., [2490, 980, 980, 980] with a ratio of 1:1:1 and [2384, 702, 702, 980] with a ratio of 3:3:4.

For $l = 0$   Equation 25

$$s \cdot (2r_0 + r_1) \left\lfloor \frac{k}{s \cdot r_0} \right\rfloor + \mathrm{mod}(k, s \cdot r_0)$$

$$k = 0, 1, \ldots, (N_1 - 1)$$

For $l = 1$ $$s \cdot (2r_0 + r_1) \left\lfloor \frac{k}{s \cdot r_0} \right\rfloor + s \cdot r_0 + \mathrm{mod}(k, s \cdot r_0)$$

$$k = 0, 1, \ldots, (N_1 - 1)$$

For $l = 2$ $$s \cdot (2r_0 + r_1) \left\lfloor \frac{k}{s \cdot r_1} \right\rfloor + s \cdot 2r_0 + \text{mod}(k, s \cdot r_1)$$

$$k = 0, 1, \ldots, \left(\frac{N_1 \cdot r_1}{r_0} - 1\right)$$

In the case of leftover tones over the last segment $l_2$, Equation 26 can be used. For $l=2$ $$\left(s \cdot (2r_0 + r_1) \left\lfloor \frac{k}{s \cdot r_1} \right\rfloor + s \cdot 2r_0 + \text{mod}(k, s \cdot r_1)\right)_{k=\frac{N_1 \cdot r_1}{r_0}-1} +$$

$$1 + s \cdot r_1 \left\lfloor \frac{k - \frac{N_2 \cdot r_1}{r_0}}{s \cdot r_1} \right\rfloor + \text{mod}\left(k - \frac{N_2 \cdot r_1}{r_0}, s \cdot r_1\right) \quad \text{Equation 26}$$

$$k = \frac{N_1 \cdot r_1}{r_0}, \ldots, (N_2 - 1)$$

As examples of three segments ($l=0$, $l=1$, $l=2$, $l=3$) with RU996+RU996+RU996+RU996 ($r_0=1$, $r_1=1$, $r_2=1$, $r_3=1$), RU484+RU996+RU996+RU996 ($r_0=1$, $r_1=2$, $r_2=2$, $r_3=2$) and RU242+RU996+RU996+RU996 ($r_0=1$, $r_1=4$, $r_2=4$, $r_3=4$) can be used. In these examples, length of ($l=3$) is equal to or longer than length of ($l=2$) and length of ($l=2$) is equal to or longer than length of ($l=1$) and length of ($l=1$) is equal to or longer than length of ($l=0$). However, RU996+RU484+RU996+RU996 or RU996+RU996+RU484+RU996 or RU996+RU996+RU996+RU484 can follow the same rule as shown in Equation 27.

For $l = 0$ Equation 27

$$s \cdot (r_0 + r_1 + r_2 + r_3) \left\lfloor \frac{k}{s \cdot r_0} \right\rfloor + \text{mod}(k, s \cdot r_0)$$

$$k = 0, 1, \ldots, (N_1 - 1)$$

For $l = 1$ $$s \cdot (r_0 + r_1 + r_2 + r_3) \left\lfloor \frac{k}{s \cdot r_1} \right\rfloor + s \cdot r_0 + \text{mod}(k, s \cdot r_1)$$

$$k = 0, 1, \ldots, \left(\frac{N_1 \cdot r_1}{r_0} - 1\right)$$

For $l = 2$ $$s \cdot (r_0 + r_1 + r_2 + r_3) \left\lfloor \frac{k}{s \cdot r_2} \right\rfloor + s \cdot (r_0 + r_1) + \text{mod}(k, s \cdot r_2)$$

$$k = 0, 1, \ldots, \left(\frac{N_1 \cdot r_2}{r_0} - 1\right)$$

For $l = 3$ $$s \cdot (r_0 + r_1 + r_2 + r_3) \left\lfloor \frac{k}{s \cdot r_3} \right\rfloor + s \cdot (r_0 + r_1 + r_2) + \text{mod}(k, s \cdot r_3)$$

$$k = 0, 1, \ldots, \left(\frac{N_1 \cdot r_3}{r_0} - 1\right)$$

For $l = 1$ Equation 28

$$(s \cdot (r_0 + r_1 + r_2 + r_3) \left\lfloor \frac{k}{s \cdot r_1} \right\rfloor + s \cdot r_0 + \text{mod}(k, s \cdot r_1))_{k=\frac{N_1 \cdot r_1}{r_0}-1} + 1 + s \cdot (r_2 + r_3) +$$

$$s \cdot (r_1 + r_2 + r_3) \left\lfloor \frac{k - \frac{N_1 \cdot r_1}{r_0}}{s \cdot r_1} \right\rfloor + \text{mod}\left(k - \frac{N_1 \cdot r_1}{r_0}, s \cdot r_1\right)$$

$$k = \frac{N_1 \cdot r_1}{r_0}, \ldots, (N_2 - 1)$$

For $l = 2$ $$(s \cdot (r_0 + r_1 + r_2 + r_3) \left\lfloor \frac{k}{s \cdot r_2} \right\rfloor + s \cdot (r_0 + r_1) + \text{mod}(k, s \cdot r_2))_{k=\frac{N_1 \cdot r_2}{r_0}-1} + 1 +$$

$$s \cdot (r_1 + r_3) + s \cdot (r_1 + r_2 + r_3) \left\lfloor \frac{k - \frac{N_1 \cdot r_2}{r_0}}{s \cdot r_2} \right\rfloor +$$

$$\text{mod}\left(k - \frac{N_1 \cdot r_2}{r_0}, s \cdot r_2\right)$$

$$k = \frac{N_1 \cdot r_2}{r_0}, \ldots, (N_3 - 1)$$

For $l = 3$ $$(s \cdot (r_0 + r_1 + r_2 + r_3) \left\lfloor \frac{k}{s \cdot r_3} \right\rfloor + s \cdot (r_0 + r_1 + r_2) + \text{mod}(k, s \cdot r_3))_{k=\frac{N_1 \cdot r_3}{r_0}-1} + 1 + s \cdot (r_1 + r_2) +$$

$$s \cdot (r_1 + r_2 + r_3) \left\lfloor \frac{k - \frac{N_1 \cdot r_3}{r_0}}{s \cdot r_3} \right\rfloor +$$

$$\text{mod}\left(k - \frac{N_1 \cdot r_3}{r_0}, s \cdot r_3\right)$$

$$k = \frac{N_1 \cdot r_3}{r_0}, \ldots, (N_4 - 1)$$

In the case of leftover tones over the three longer segments, Equation 29 can be used.

For $l = 1$ Equation 29

$$(s \cdot (r_0 + r_1 + r_2 + r_3) \left\lfloor \frac{k}{s \cdot r_1} \right\rfloor + s \cdot r_0 + \text{mod}(k, s \cdot r_1))_{k=\frac{N_1 \cdot r_1}{r_0}-1} + 1 + s \cdot (r_2 + r_3) +$$

$$s \cdot (r_1 + r_2 + r_3) \left\lfloor \frac{k - \frac{N_1 \cdot r_1}{r_0}}{s \cdot r_1} \right\rfloor + \text{mod}\left(k - \frac{N_1 \cdot r_1}{r_0}, s \cdot r_1\right)$$

$$k = \frac{N_1 \cdot r_1}{r_0}, \ldots, (N_2 - 1)$$

For $l = 2$ $$(s \cdot (r_0 + r_1 + r_2 + r_3) \left\lfloor \frac{k}{s \cdot r_2} \right\rfloor +$$

$$s \cdot (r_0 + r_1) + \text{mod}(k, s \cdot r_2))_{k=\frac{N_1 \cdot r_2}{r_0}-1} + 1 +$$

$$s \cdot (r_1 + r_3) + s \cdot (r_1 + r_2 + r_3) \left\lfloor \frac{k - \frac{N_1 \cdot r_2}{r_0}}{s \cdot r_2} \right\rfloor +$$

$$\text{mod}\left(k - \frac{N_1 \cdot r_2}{r_0}, s \cdot r_2\right)$$

-continued $$k = \frac{N_1 \cdot r_2}{r_0}, \ldots, (N_3 - 1)$$

For $l = 3$ $$(s \cdot (r_0 + r_1 + r_2 + r_3)) \left\lfloor \frac{k}{s \cdot r_3} \right\rfloor + s \cdot (r_0 + r_1 + r_2) +$$

$$\mathrm{mod}(k, s \cdot r_3))_{k = \frac{N_1 \cdot r_3}{r_0} - 1} + 1 + s \cdot (r_1 + r_2) +$$

$$s \cdot (r_1 + r_2 + r_3) \left\lfloor \frac{k - \frac{N_1 \cdot r_3}{r_0}}{s \cdot r_3} \right\rfloor +$$

$$\mathrm{mod}\left(k - \frac{N_1 \cdot r_3}{r_0}, s \cdot r_3\right)$$

$$k = \frac{N_1 \cdot r_3}{r_0}, \ldots, (N_4 - 1)$$

Figure 30:
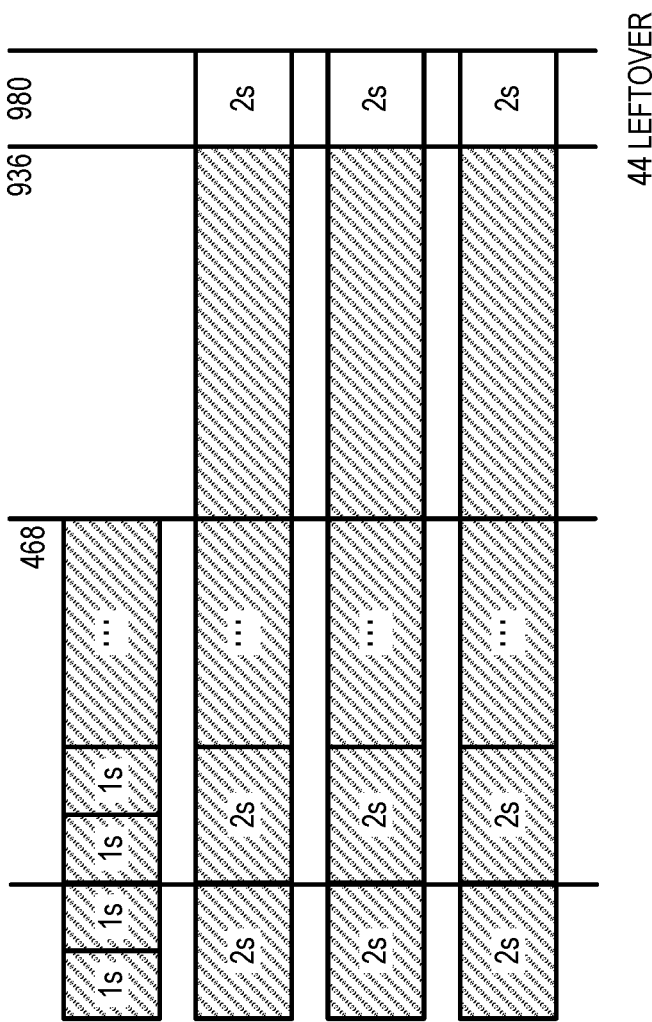
FIG. 30 shows a transmission with three 996-tone RUs and one 484-tone RU, in accordance with some embodiments of the present disclosure.

If some of r0, r1, r2, and r3 have the same number, the corresponding equations could be simplified. For example, when RU484 and three RU996 are combined to be transmitted with r0 and r1 (as shown in FIG. 30), Equation 30 can be used.

For $l = 0$                                   Equation 30

$$s \cdot (r_0 + 3r_1) \left\lfloor \frac{k}{s \cdot r_0} \right\rfloor + \mathrm{mod}(k, s \cdot r_0)$$

$$k = 0, 1, \ldots, (N_1 - 1)$$

For $l = 1$ $$s \cdot (r_0 + 3r_1) \left\lfloor \frac{k}{s \cdot r_1} \right\rfloor + s \cdot r_0 + \mathrm{mod}(k, s \cdot r_1)$$

For $l = 2$ $$s \cdot (r_0 + 3r_1) \left\lfloor \frac{k}{s \cdot r_1} \right\rfloor + s \cdot (r_0 + r_1) + \mathrm{mod}(k, s \cdot r_1) \Bigg\} k =$$

For $l = 3$ $$s \cdot (r_0 + 3r_1) \left\lfloor \frac{k}{s \cdot r_1} \right\rfloor + s \cdot (r_0 + 2r_1) + \mathrm{mod}(k, s \cdot r_1)$$

$$0, 1, \ldots, \left(\frac{N_1 \cdot r_1}{r_0} - 1\right)$$

In the case of leftover tones over the three longer segments, Equation 31 can be used.

For $l = 1$                                   Equation 31

$$\left(s \cdot (r_0 + 3r_1) \left\lfloor \frac{k}{s \cdot r_1} \right\rfloor + s \cdot r_0 + \mathrm{mod}(k, s \cdot r_1)\right)_{k = \frac{N_1 \cdot r_1}{r_0} - 1} + 1 +$$

$$s \cdot 2r_1 + s \cdot 3r_1 \left\lfloor \frac{k - \frac{N_1 \cdot r_1}{r_0}}{s \cdot r_1} \right\rfloor + \mathrm{mod}\left(k - \frac{N_1 \cdot r_1}{r_0}, s \cdot r_1\right)$$

For $l = 2$ $$\left(s \cdot (r_0 + 3r_1) \left\lfloor \frac{k}{s \cdot r_1} \right\rfloor + s \cdot (r_0 + r_1) + \mathrm{mod}(k, s \cdot r_1)\right)_{k = \frac{N_1 \cdot r_1}{r_0} - 1} +$$

$$1 + s \cdot 2r_1 + s \cdot 3r_1 \left\lfloor \frac{k - \frac{N_1 \cdot r_1}{r_0}}{s \cdot r_1} \right\rfloor + \mathrm{mod}\left(k - \frac{N_1 \cdot r_1}{r_0}, s \cdot r_1\right)$$

For $l = 3$ $$(s \cdot (r_0 + 3r_1) \left\lfloor \frac{k}{s \cdot r_1} \right\rfloor + s \cdot (r_0 + 2r_1) +$$

$$\mathrm{mod}(k, s \cdot r_1))_{k = \frac{N_1 \cdot r_1}{r_0} - 1} + 1 + s \cdot 2r_1 +$$

$$s \cdot 3r_1 \left\lfloor \frac{k - \frac{N_1 \cdot r_1}{r_0}}{s \cdot r_1} \right\rfloor + \mathrm{mod}\left(k - \frac{N_1 \cdot r_1}{r_0}, s \cdot r_1\right)$$

$$k = \frac{N_1 \cdot r_1}{r_0}, \ldots, (N_2 - 1)$$

Figure 31:
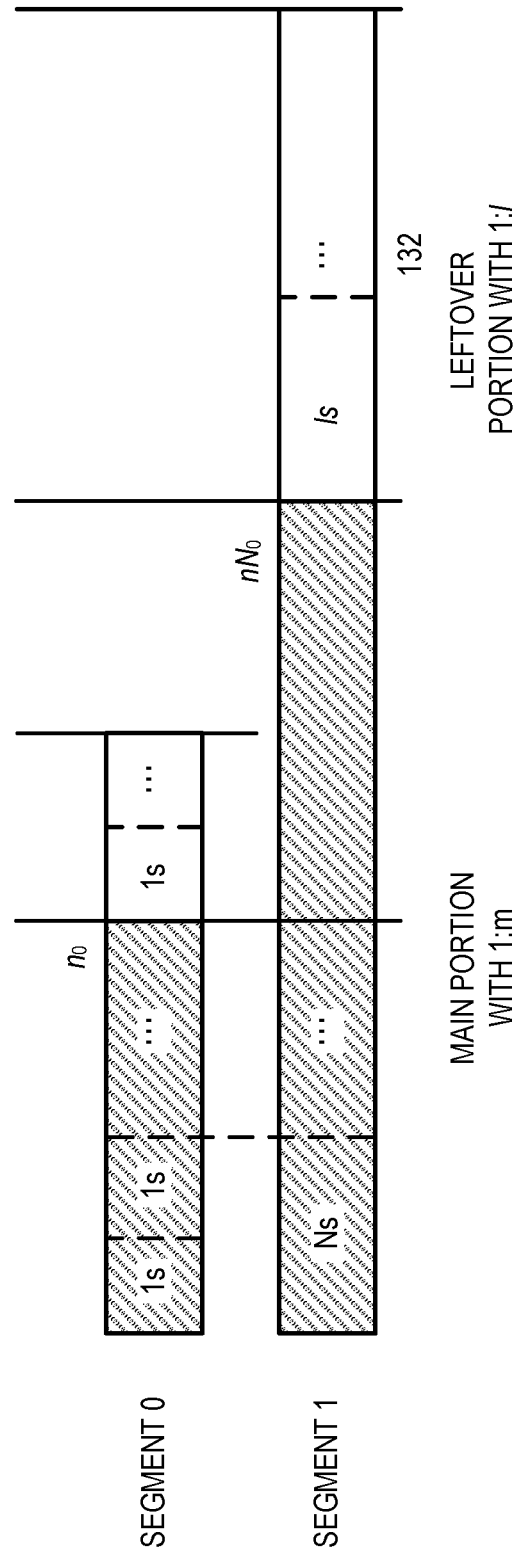
FIG. 31 shows a distribution of tones into RUs using a modified round robin method, in accordance with some embodiments of the present disclosure.

In some embodiments, a modified proportional round robin method/technique can be used for distributing tones. These methods provide a simplified proportional round robin approach that evenly apply leftover portions/tones in addition to a main portion with a limited number of ratios. In particular, leftover tones exist for all segments to be proportionally distributed in a round robin technique. For example, $N_0$ is the introduced reference number to calculate the equations for the segment parser. The main portion of tones and leftover portion of tones include 1:m and 1:1 proportional round robin distribution over segments, respectively, as shown in FIG. 31.

For RU484+RU996 and RU484+RU996+RU996, as shown in FIG. 32, its main portion ratio is 1:2 and there are 44 and 132 leftover tones for RU484 and RU996, respectively. Considering s, max(1, $N_{BPSCS}/2$), s and 2s are distributed first to segments in a round robin fashion and s and 3s are distributed in a round robin fashion for leftover tones. $N_0$ is the introduced reference number to calculate the equations for a segment parser.

Figure 33:
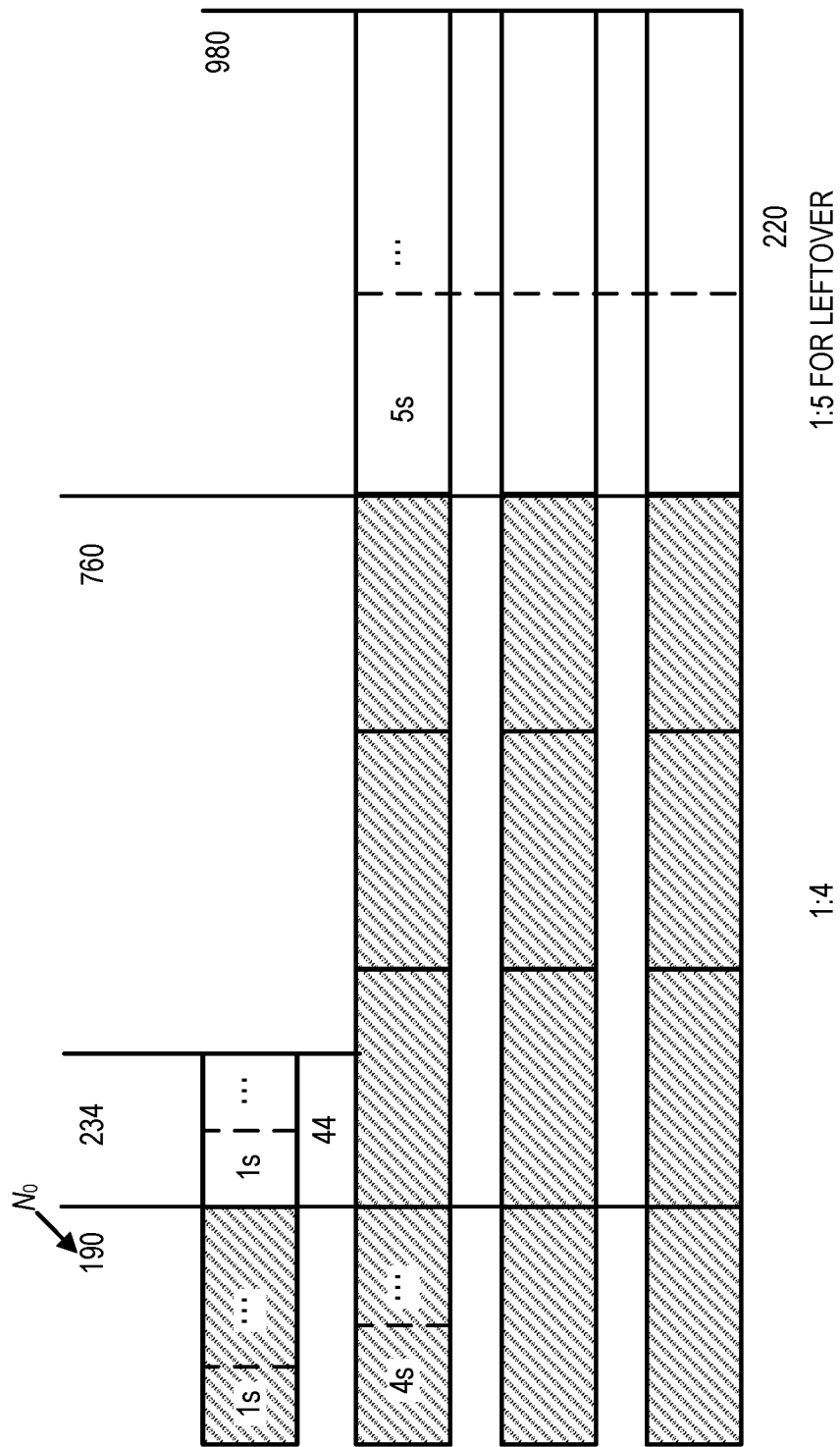
FIG. 33 shows a distribution of tones into 242-tone RUs and 996-tone RUs using a modified round robin method, in accordance with some embodiments of the present disclosure.

For RU242+RU996+RU996+RU996, as shown in FIG. 33, its main portion ratio is 1:4 and there are 44 and 220 leftover tones for RU242 and RU996, respectively. Considering s, max(1, $N_{BPSCS}/2$), s, 4s, 4s and 4s are distributed first to segments in a round robin fashion and s, 5s, 5s and 5s are distributed in a round robin fashion for leftover tones. $N_0$ is the introduced reference number to calculate the equations for a segment parser.

Figure 34:
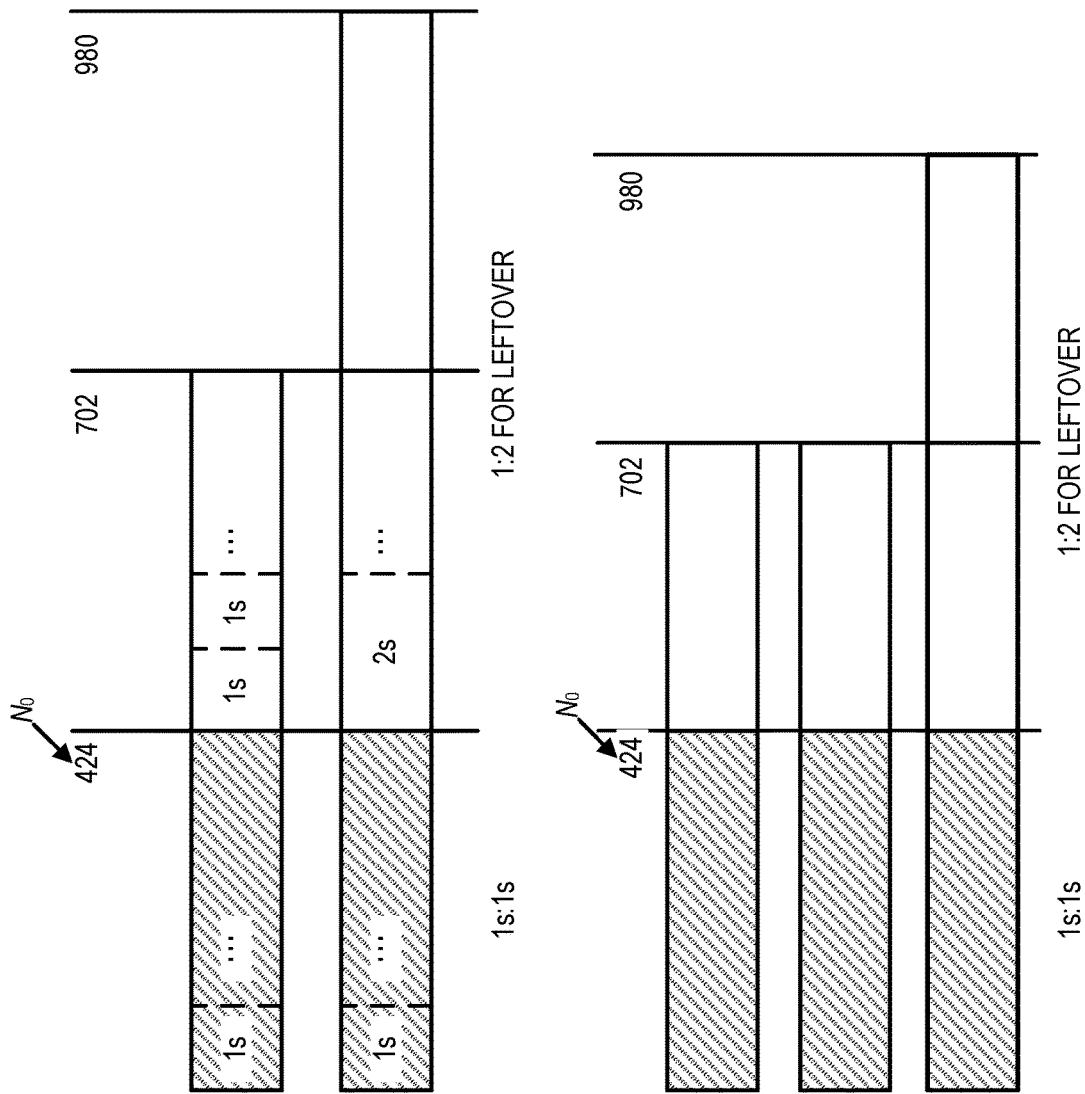
FIG. 34 shows a first method for 726-tone RUs and 996-tone RUs using a modified round robin method, in accordance with some embodiments of the present disclosure.

Two methods are described for tone distribution, in accordance with some embodiments. FIG. 34 shows a first method for RU726+RU996 and RU726+RU996+RU996. As shown in FIG. 34, its main portion ratio is 1:1 and there are 278 and 556 leftover tones for RU726 and RU996, respectively. Considering s, max(1, $N_{BPSCS}/2$), s, s are distributed first to segments in a round robin fashion and s, 2s are distributed in a round robin fashion for leftover tones. $N_0$ is the introduced reference number to calculate the equations for a segment parser.

Figure 35:
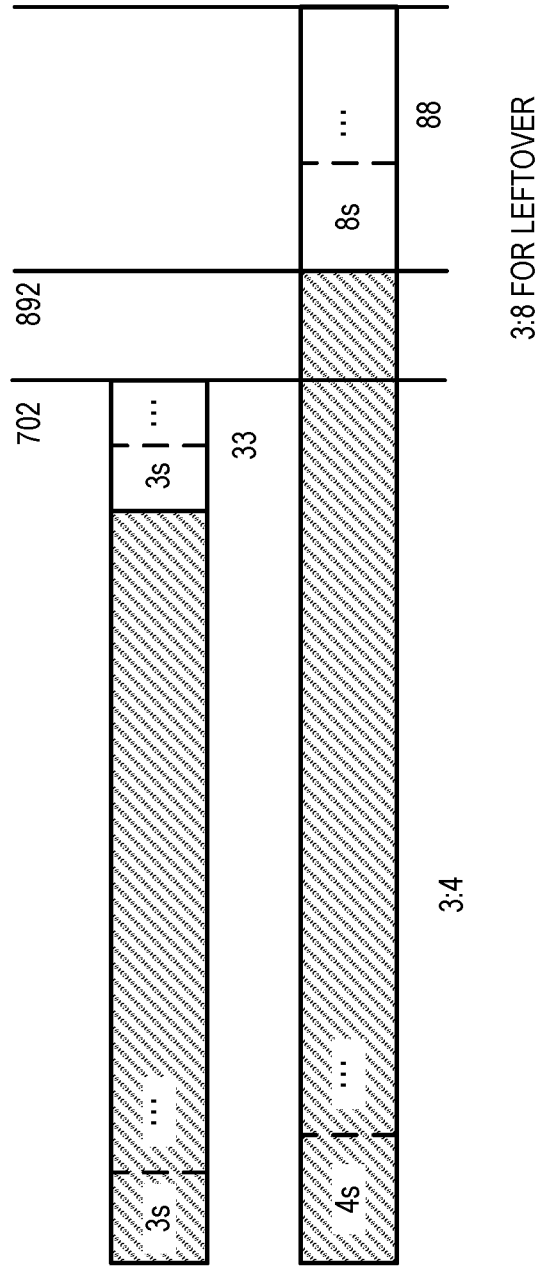
FIG. 35 shows a second method for 726-tone RUs and 996-tone RUs using a modified round robin method, in accordance with some embodiments of the present disclosure.

FIG. 35 shows a second method for RU726+RU996 and RU726+RU996+RU996. As shown in FIG. 35, its main portion ratio is 3:4 and there are 33 and 88 leftover tones for RU726 and RU996, respectively. Considering s, max(1, $N_{BPSCS}/2$), 3s, and 4s are distributed first to segments in a round robin fashion and 3s, 8s are distributed in a round robin fashion for leftover tones. To make implementation simple and to keep consistency with other multiple RU combinations, the first method may be preferred.

In some embodiments, the embodiments of FIGS. 31-35 can utilize the following equations. In particular, there are two segments with $(r_0, r_1)+(lr_0, lr_1)$ where length(l=0)≤length(l=1) where $N_0$: reference number in the figures and $lr_n$: ratio of leftover portion of RU $r_n$. In this context, (1) [980, 980] with $(r_0, r_1)=(1,1)$ and $(r_0, r_1)=(0,0)$;

(2) [468, 980] with $(r_0, r_1)=(1,2)$ and $(lr_0, lr_1)=(1,3)$; (3) [702, 980] with $(r_0, r_1)=(1,1)$ and $(lr_0, lr_1)=(1,2)$; (4) same rules could be applied to [980, 468] and [980, 702]; and (5) in case $(r_0, r_1)$ have the same values, or $(lr_0, lr_1)$ have the same values, its equations could be simplified as shown in Equations 32.

For $l = 0$ 
$$s \cdot (r_0 + r_1) \left\lfloor \frac{k}{s \cdot r_0} \right\rfloor + \mathrm{mod}(k, s \cdot r_0)$$
$$k = 0, 1, \ldots, (r_0 N_0 - 1)$$

For $l = 1$
$$s \cdot (r_0 + r_1) \left\lfloor \frac{k}{s \cdot r_1} \right\rfloor + s \cdot r_0 + \mathrm{mod}(k, s \cdot r_1)$$
$$k = 0, 1, \ldots, (r_1 N_0 - 1)$$

Equation 32

For leftover tones, Equation 33 can be used.

For $l = 0$
$$\left( s \cdot (r_0 + r_1) \left\lfloor \frac{i}{s \cdot r_0} \right\rfloor + \mathrm{mod}(i, s \cdot r_0) \right)_{i=(r_0 N_0 - 1)} + 1 + s \cdot r_1 + s \cdot (lr_0 + lr_1) \left\lfloor \frac{k - r_0 N_0}{s \cdot lr_0} \right\rfloor + \mathrm{mod}(k - r_0 N_0, s \cdot lr_0)$$
$$k = r_0 N_0, \ldots, (N_1 - 1)$$

For $l = 1$
$$\left( s \cdot (r_0 + r_1) \left\lfloor \frac{i}{s \cdot r_0} \right\rfloor + \mathrm{mod}(i, s \cdot r_0) \right)_{i=(r_0 N_0 - 1)} + 1 + s \cdot (r_1 + lr_0) + s \cdot (lr_0 + lr_1) \left\lfloor \frac{k - r_1 N_0}{s \cdot ir_1} \right\rfloor + \mathrm{mod}(k - r_1 N_0, s \cdot lr_1)$$
$$k = r_1 N_0, \ldots, (N_2 - 1)$$

Equation 33

There are three segments with $(r_0, r_1, r_2)+(lr_0, lr_1, lr_2)$ where $\mathrm{length}(l=0) \leq \mathrm{length}(l=1) \leq \mathrm{length}(l=2)$. In this context, (1) [468, 980, 980, 980] with $(r_0, r_1, r_2, r_3)=(1,2,2,2)$ and $(lr_0, lr_1, lr_2, lr_3)=(1,3,3,3)$; (2) [980, 980, 980, 980] with $(r_0, r_1, r_2, r_3)=(1,1,1,1)$ and $(lr_0, lr_1, lr_2, lr_3)=(0,0,0,0)$; (3) [234, 980, 980, 980] with $(r_0, r_1, r_2, r_3)=(1,4,4,4)$ and $(lr_0, lr_1, lr_2, lr_3)=(1,5,5,5)$; (4) the same rules could be applied to [980, 468, 980, 980], [980, 980, 468, 980], [980, 980, 980, 468], [980, 234, 980, 980], [980, 980, 234, 980] and [980, 980, 980, 234]; and (5) in case some of $(r_0, r_1, r_2, r_3)$ have the same values, or some of $(lr_0, lr_1, lr_2, lr_3)$ have the same values, its equations could be simplified as shown in Equations 34.

For $l = 0$
$$s \cdot (r_0 + r_1 + r_2 + r_3) \left\lfloor \frac{k}{s \cdot r_0} \right\rfloor + \mathrm{mod}(k, s \cdot r_0)$$
$$k = 0, 1, \ldots, (r_0 N_0 - 1)$$

For $l = 1$
$$s \cdot (r_0 + r_1 + r_2 + r_3) \left\lfloor \frac{k}{s \cdot r_1} \right\rfloor + s \cdot r_0 + \mathrm{mod}(k, s \cdot r_1)$$
$$k = 0, 1, \ldots, (r_1 N_0 - 1)$$

Equation 34

For $l = 2$
$$s \cdot (r_0 + r_1 + r_2 + r_3) \left\lfloor \frac{k}{s \cdot r_2} \right\rfloor + s \cdot (r_0 + r_1) + \mathrm{mod}(k, s \cdot r_2)$$
$$k = 0, 1, \ldots, (r_2 N_0 - 1)$$

For $l = 3$
$$s \cdot (r_0 + r_1 + r_2 + r_3) \left\lfloor \frac{k}{s \cdot r_3} \right\rfloor + s \cdot (r_0 + r_1 + r_2) + \mathrm{mod}(k, s \cdot r_3)$$
$$k = 0, 1, \ldots, (r_3 N_0 - 1)$$

For leftover tones, Equation 35 can be used.

For $l = 0$
$$\left( s \cdot (r_0 + r_1 + r_2 + r_3) \left\lfloor \frac{i}{s \cdot r_0} \right\rfloor + \mathrm{mod}(i, s \cdot r_0) \right)_{i=(r_0 N_0 - 1)} + 1 + s \cdot (r_1 + r_2 + r_3) + s \cdot (lr_0 + lr_1 + lr_2 + lr_3) \left\lfloor \frac{k - r_0 N_0}{s \cdot ir_0} \right\rfloor + \mathrm{mod}(k - r_0 N_0, s \cdot lr_0)$$
$$k = r_0 N_0, \ldots, (N_1 - 1)$$

Equation 35

For $l = 1$
$$\left( s \cdot (r_0 + r_1 + r_2 + r_3) \left\lfloor \frac{i}{s \cdot r_0} \right\rfloor + \mathrm{mod}(i, s \cdot r_0) \right)_{i=(r_0 N_0 - 1)} + 1 + s \cdot (r_1 + r_2 + r_3 + lr_0) + s \cdot (lr_0 + lr_1 + lr_2 + lr_3) \left\lfloor \frac{k - r_1 N_0}{s \cdot lr_1} \right\rfloor + \mathrm{mod}(k - r_1 N_0, s \cdot lr_1)$$
$$k = r_1 N_0, \ldots, (N_2 - 1)$$

For $l = 2$
$$\left( s \cdot (r_0 + r_1 + r_2 + r_3) \left\lfloor \frac{i}{s \cdot r_0} \right\rfloor + \mathrm{mod}(i, s \cdot r_0) \right)_{i=(r_0 N_0 - 1)} + 1 + s \cdot (r_1 + r_2 + r_3 + lr_0 + lr_1) + s \cdot (lr_0 + lr_1 + lr_2 + lr_3) \left\lfloor \frac{k - r_2 N_0}{s \cdot lr_2} \right\rfloor + \mathrm{mod}(k - r_2 N_0, s \cdot lr_2)$$
$$k = r_1 N_0, \ldots, (N_3 - 1)$$

For $l = 3$
$$\left( s \cdot (r_0 + r_1 + r_2 + r_3) \left\lfloor \frac{i}{s \cdot r_3} \right\rfloor + \mathrm{mod}(i, s \cdot r_0) \right)_{i=(r_0 N_0 - 1)} + 1 + s \cdot (r_1 + r_2 + r_3 + lr_0 + lr_1 + lr_2) + s(lr_0 + lr_1 + lr_2 + lr_3) \left\lfloor \frac{k - r_3 N_0}{s \cdot lr_3} \right\rfloor + \mathrm{mod}(k - r_3 N_0, s \cdot lr_3)$$
$$k = r_1 N_0, \ldots, (N_3 - 1)$$

Figure 36:
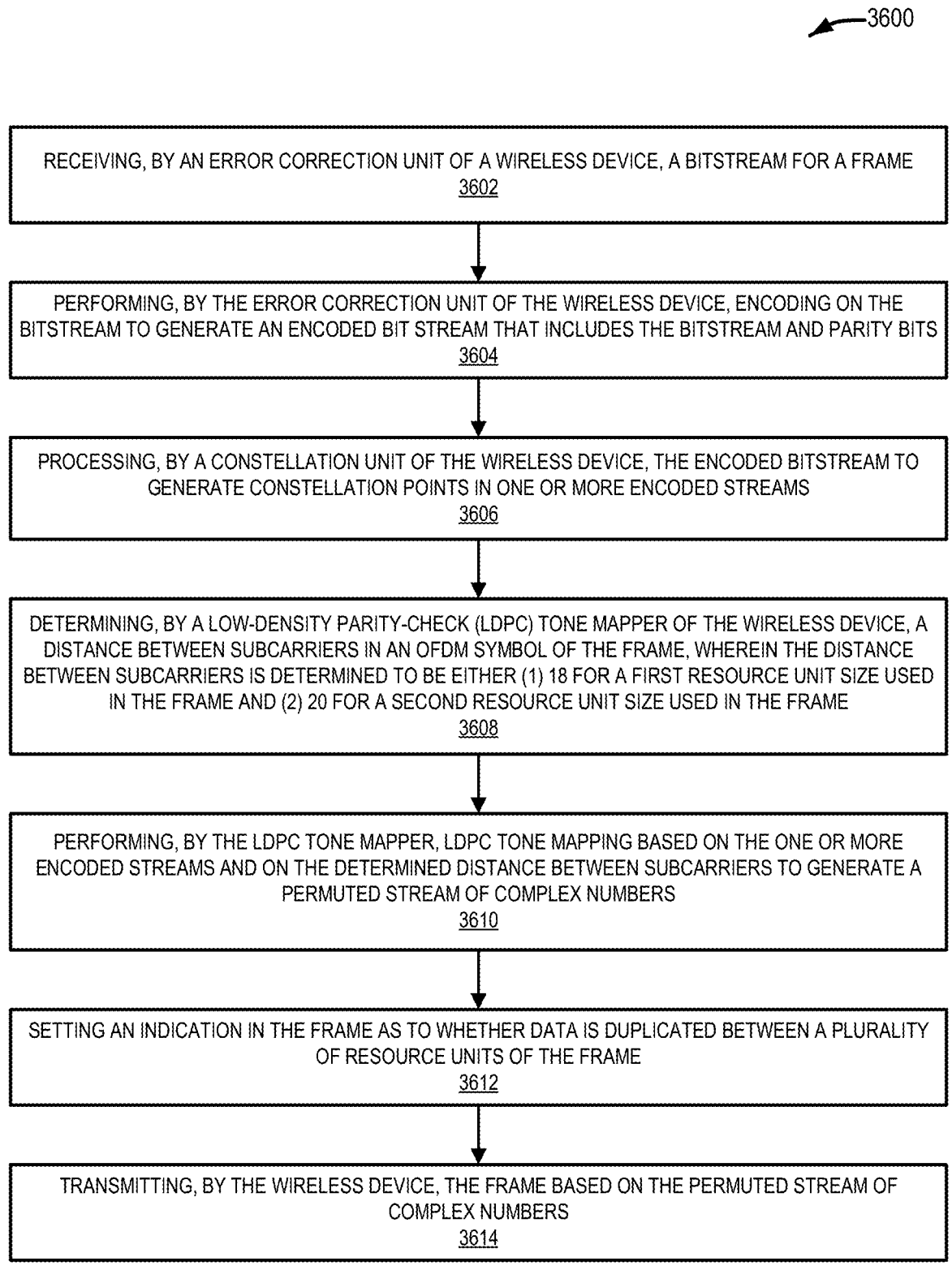
FIG. 36 shows a method for generating and transmitting a frame, in accordance with an example embodiment.

Turning to FIG. 36, a method 3600 will be described for generating and transmitting a frame. The method 3600 may be performed by a station/wireless device in a wireless network. In some embodiments, the method 3600 may be performed in relation to one or more of the details described in other portions of the description. Although described and shown in a particular order, in other embodiments one or more of the operations of the method 3600 may be performed in a different order, including in partially or entirely overlapping time periods.

As shown in FIG. 36, the method 3600 may commence at operation 3602 with an error correction unit of a wireless device receiving a bitstream. The bitstream may include user data, including any of the fields of a frame/PPDU described herein, and data management information. In one embodiment, the error correction unit can be an LDPC encoder.

At operation 3604, the error correction unit may perform encoding on the bitstream to generate an encoded bitstream. The encoded bitstream may include data/bits corresponding to the originally received bitstream and parity bits/information. For example, the error correction unit may be a LDPC encoder that performs LDPC on the bitstream to generate LDPC parity bits.

At operation 3606, a constellation unit of the wireless device processes the encoded bitstream to generate constellation points in one or more encoded streams.

At operation 3608, a LDPC tone mapper of the wireless device determines a distance between subcarriers (measured in a number of separating subcarriers/tones between subcarriers) in an OFDM symbol of the frame. In one embodiment, the distance between subcarriers is determined to be (1) 18 for a first resource unit size used in the frame and (2) 20 for a second resource unit size used in the frame. In one embodiment, the first resource unit size is 726 tones. In one embodiment, when the first resource unit size is 726 tones, a number of data subcarriers per frequency segment ($N_{sd}$) of the first resource unit size is 702 and a number of pilot subcarriers per frequency segment ($N_{sp}$) of the first resource unit size is 24. In one embodiment, the second resource unit size is one of 2×996 tones, 3×996 tones, and 4×996 tones.

At operation 3610, the LDPC tone mapper performs tone mapping based on the one or more encoded streams and on the determined distance between subcarriers to generate a permuted stream of complex numbers.

At operation 3612, the wireless device sets an indication in the frame as to whether data is duplicated between a plurality of resource units of the frame. In one embodiment, setting the indication includes modifying a set of fields in the frame to a first state to indicate that data is duplicated between the plurality of resource units of the frame and is set to a second state to indicate that data is not duplicated between the plurality of resource units of the frame. For example, the frame may include a signaling field in a preamble of the frame and the signaling field includes a set of user fields for the wireless device, wherein the indication is in the set of user fields. In some embodiments, the plurality of resource sizes includes one of (1) two 996-tone resource units and (2) four 996-tone resource units. In some embodiments, the wireless transmission is a non-multi-user multiple-input multiple-output transmission.

At operation 3614, the wireless device transmits the frame to another wireless device (or a set of wireless devices) based on the permuted stream of complex numbers (i.e., the frame includes data/codewords that are generated based on the permuted stream of complex numbers) and the frame includes the indication regarding duplicated data in a plurality of resource units (i.e., duplication indication).

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for encoding a bitstream for a frame in a wireless transmission, the method comprising:
   receiving, by an error correction unit of a wireless device, the bitstream;
   performing, by the error correction unit, encoding on the bitstream to generate an encoded bit stream that includes the bitstream and parity bits;
   processing, by a constellation unit of the wireless device, the encoded bitstream to generate constellation points in one or more encoded streams;
   determining, by a low-density parity-check (LDPC) tone mapper of the wireless device, a distance between subcarriers in an Orthogonal Frequency Division Multiplexing (OFDM) symbol of the frame; and
   performing, by the LDPC tone mapper, LDPC tone mapping based on the one or more encoded streams and on the determined distance between subcarriers to generate a permuted stream of complex numbers,
   wherein the distance between subcarriers is determined to be either (1) 18 for a first resource unit size used in the frame or (2) 20 for a second resource unit size used in the frame, and
   wherein the first resource unit size is 726 tones.

2. The method of claim 1, wherein a number of data subcarriers per frequency segment ($N_{sd}$) of the first resource unit size is 702 and a number of pilot subcarriers per frequency segment ($N_{sp}$) of the first resource unit size is 24.

3. The method of claim 1, wherein the second resource unit size is one of 2×996 tones, 3×996 tones, or 4×996 tones.

4. The method of claim 1, further comprising:
   setting an indication in the frame as to whether data is duplicated between a plurality of resource units of the frame.

5. The method of claim 4, wherein setting the indication includes modifying a set of fields in the frame to a first state to indicate that data is duplicated between the plurality of resource units of the frame and is set to a second state to indicate that data is not duplicated between the plurality of resource units of the frame.

6. The method of claim 5, wherein the frame includes a signaling field in a preamble of the frame and the signaling field includes a set of user fields for the wireless device, wherein the indication is in the set of user fields.

7. The method of claim 5, wherein the plurality of resource sizes includes one of (1) two 996-tone resource units or (2) four 996-tone resource units.

8. The method of claim 6, wherein the wireless transmission is a non-multi-user multiple-input multiple-output transmission.

9. A device for encoding a bitstream for a frame in a wireless transmission, the device comprising:
   a memory device storing a set of instructions; and
   a processor coupled to the memory device, wherein the set of instructions when executed by the processor cause the device to:
      receive the bitstream;
      perform encoding on the bitstream to generate an encoded bit stream that includes the bitstream and parity bits;
      process the encoded bitstream to generate constellation points in one or more encoded streams;
      determine a distance between subcarriers in an Orthogonal Frequency Division Multiplexing (OFDM) symbol of the frame;
      perform low-density parity-check (LDPC) tone mapping based on the one or more encoded streams and on the determined distance between subcarriers to generate a permuted stream of complex numbers, wherein the distance between subcarriers is determined to be either (1) 18 for a first resource unit size used in the frame or (2) 20 for a second resource unit size used in the frame; and
      set an indication in the frame as to whether data is duplicated between a plurality of resource units of the frame.

10. The device of claim 9, wherein the first resource unit size is 726 tones.

11. The device of claim 9, wherein the second resource unit size is one of 2×996 tones, 3×996 tones, or 4×996 tones.

12. The device of claim 9, wherein setting the indication includes modifying a set of fields in the frame to a first state to indicate that data is duplicated between the plurality of resource units of the frame and is set to a second state to indicate that data is not duplicated between the plurality of resource units of the frame.

13. The device of claim 10, wherein a number of data subcarriers per frequency segment ($N_{sd}$) of the first resource unit size is 702 and a number of pilot subcarriers per frequency segment ($N_{sp}$) of the first resource unit size is 24.

14. The device of claim 12, wherein the frame includes a signaling field in a preamble of the frame and the signaling field includes a set of user fields for the wireless device, wherein the indication is in the set of user fields.

15. The device of claim 12, wherein the plurality of resource sizes includes one of (1) two 996-tone resource units or (2) four 996-tone resource units.

16. The device of claim 14, wherein the wireless transmission is a non-multi-user multiple-input multiple-output transmission.

17. A non-transitory machine-readable medium that stores instructions, which when executed by a processor of a wireless device, cause the wireless device to:
   receive the bitstream;
   perform encoding on the bitstream to generate an encoded bit stream that includes the bitstream and parity bits;

process the encoded bitstream to generate constellation points in one or more encoded streams;

determine a distance between subcarriers in an Orthogonal Frequency Division Multiplexing (OFDM) symbol of the frame; and perform low-density parity-check (LDPC) tone mapping based on the one or more encoded streams and on the determined distance between subcarriers to generate a permuted stream of complex numbers, wherein the distance between subcarriers is determined to be either (1) 18 for a first resource unit size used in the frame or (2) 20 for a second resource unit size used in the frame, and wherein the second resource unit size is one of 2×996 tones, 3×996 tones, or 4×996 tones.

18. The non-transitory machine-readable medium of claim 17, wherein the first resource unit size is 726 tones; and wherein a number of data subcarriers per frequency segment ($N_{sd}$) of the first resource unit size is 702 and a number of pilot subcarriers per frequency segment ($N_{sp}$) of the first resource unit size is 24.

19. The non-transitory machine-readable medium of claim 17, wherein the set of instructions, when executed by the processor further cause the wireless device to:

set an indication in the frame as to whether data is duplicated between a plurality of resource units of the frame, and wherein setting the indication includes modifying a set of fields in the frame to a first state to indicate that data is duplicated between the plurality of resource units of the frame and is set to a second state to indicate that data is not duplicated between the plurality of resource units of the frame.

20. The non-transitory machine-readable medium of claim 19, wherein the frame includes a signaling field in a preamble of the frame and the signaling field includes a set of user fields for the wireless device, wherein the indication is in the set of user fields.

* * * * *